US010351256B2

(12) United States Patent
Chang et al.

(10) Patent No.: US 10,351,256 B2
(45) Date of Patent: Jul. 16, 2019

(54) SYSTEMS AND METHODS FOR AIRCRAFT REFUELING

(71) Applicant: The Boeing Company, Chicago, IL (US)

(72) Inventors: Kevin Julian Chang, Seattle, WA (US); Timothy J. Walsh, Santa Rosa Beach, FL (US)

(73) Assignee: The Boeing Company, Chicago, IL (US)

( * ) Notice: Subject to any disclaimer, the term of this patent is extended or adjusted under 35 U.S.C. 154(b) by 99 days.

(21) Appl. No.: 15/476,156

(22) Filed: Mar. 31, 2017

(65) Prior Publication Data
US 2018/0281986 A1 Oct. 4, 2018

(51) Int. Cl.
B64D 45/00 (2006.01)
B64D 39/06 (2006.01)
B64D 47/02 (2006.01)
B64D 39/00 (2006.01)

(52) U.S. Cl.
CPC ............ B64D 45/00 (2013.01); B64D 39/00 (2013.01); B64D 39/06 (2013.01); B64D 47/02 (2013.01); B64D 2203/00 (2013.01)

(58) Field of Classification Search
CPC ...................................................... B64D 45/00
See application file for complete search history.

(56) References Cited

U.S. PATENT DOCUMENTS

| 4,158,885 A | | 6/1979 | Neuberger | |
|---|---|---|---|---|
| 5,904,729 A | * | 5/1999 | Ruzicka | B64D 39/00 244/135 A |
| 7,663,506 B2 | * | 2/2010 | Lundberg | B64D 39/00 340/945 |
| 9,061,772 B1 | * | 6/2015 | Hartwell | B64D 47/06 |
| 9,067,689 B2 | * | 6/2015 | Chang | B64D 39/00 |
| 2006/0000949 A1 | | 1/2006 | Schroeder | |

(Continued)

FOREIGN PATENT DOCUMENTS

EP 2 014 552 1/2009

OTHER PUBLICATIONS

Extended European Search Report prepared by the European Patent Office in Application No. EP 18 16 0125 dated Jul. 20, 2018.

Primary Examiner — Hussein Elchanti
Assistant Examiner — Michael A Berns
(74) Attorney, Agent, or Firm — McDonnell Boehnen Hulbert & Berghoff LLP

(57) ABSTRACT

In an example, an indication system includes a plurality of light sources communicatively coupled with a control system. The indication system can be used with a refueling system, including a hose for supplying fuel to a receiver aircraft. Each light source is configured to simultaneously emit visible light and infrared light, and is operable at a dim setting and a bright setting. The control system receives refueling data from the refueling system. The refueling data includes position data indicating a position of the receiver aircraft relative to the refueling system. The control system is configured to, when the refueling data indicates that the position of the receiver aircraft is in a refueling range, activate at least one refueling light source of the plurality of refueling light sources at the bright setting and activate a remainder of the refueling light sources at the dim setting.

20 Claims, 15 Drawing Sheets

(56) References Cited

U.S. PATENT DOCUMENTS

| | | | |
|---|---|---|---|
| 2007/0023576 A1* | 2/2007 | Schroeder | B64D 39/00 244/135 A |
| 2009/0015436 A1 | 1/2009 | Lundberg et al. | |
| 2009/0032711 A1 | 2/2009 | Hewitt et al. | |
| 2010/0217526 A1 | 8/2010 | McElveen | |
| 2012/0193478 A1* | 8/2012 | Hrncir | B64D 39/00 244/135 A |
| 2014/0358335 A1 | 12/2014 | Sanchez Ruiz | |
| 2015/0083864 A1 | 3/2015 | Black et al. | |

\* cited by examiner

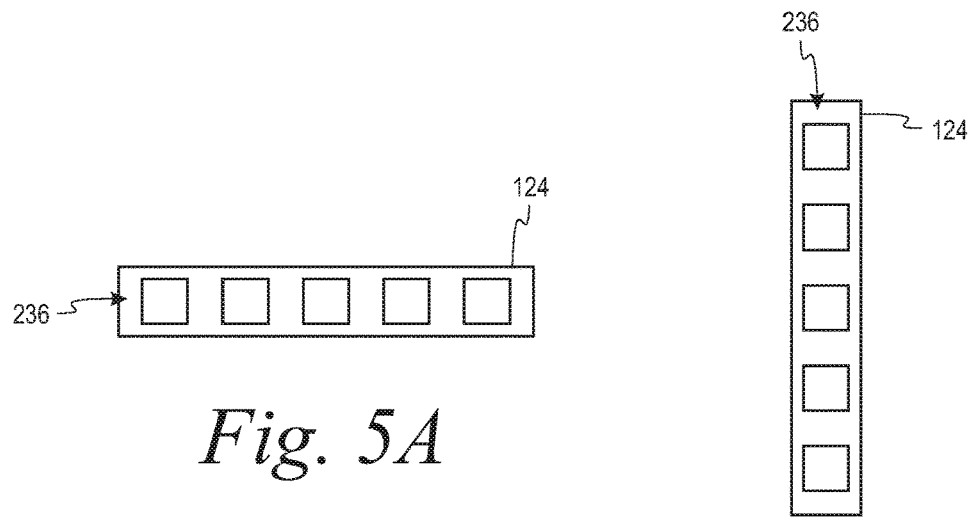
*Fig. 5A*
*Fig. 5B*
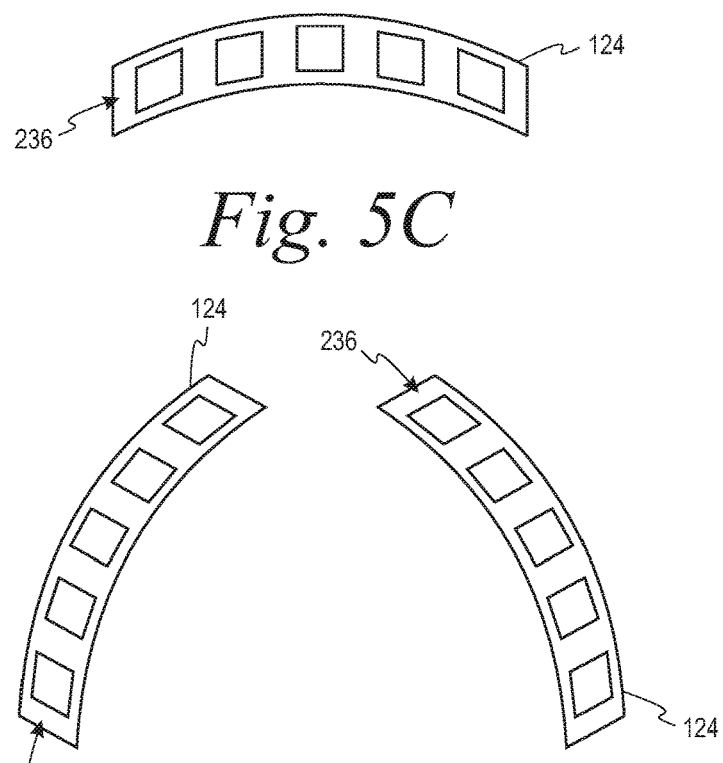
*Fig. 5C*
*Fig. 5D*

SYSTEMS AND METHODS FOR AIRCRAFT REFUELING

FIELD

The present disclosure generally relates to systems and methods for aircraft refueling, and more particularly to refueling systems and methods for providing indications to a receiver aircraft during aerial refueling operations.

BACKGROUND

During aerial refueling operations, a tanker aircraft supplies fuel to a receiver aircraft while in-flight. One approach to aerial refueling is known as probe-and-drogue refueling. In a probe-and-drogue system, the tanker aircraft extends a flexible hose, which trails out behind and below the tanker aircraft. The receiver aircraft has a probe, which the receiver aircraft maneuvers into engagement with a drogue at a free end of the hose of the tanker aircraft. After the probe couples to the drogue and hose, the tanker aircraft supplies fuel to the receiver aircraft provided the receiver aircraft remains within a refueling range of the tanker aircraft.

During an aerial refueling operation, the receiver aircraft is generally responsible for maneuvering relative to the tanker aircraft to couple the probe on the receiver aircraft with the hose and drogue of the tanker aircraft. Once coupled, the receiver aircraft attempts to maintain a position within the refueling range of the tanker aircraft so that the receiver aircraft can receive fuel at a safe distance of separation from the tanker aircraft. To help the receiver aircraft accomplish these tasks, the tanker aircraft may provide to the receiver aircraft positional and/or operational feedback during the aerial refueling operation.

In one approach, the tanker aircraft includes an indication system for providing visual indications of the positional and/or operational feedback to the receiver aircraft. The indication system typically consists of a single not-ready light source for emitting a red light, a single waiting light source for emitting an amber light, and a single refueling light source for emitting a green light to provide indications in the visible light spectrum. Before the receiver aircraft couples to the tanker aircraft, the indication system activates the not-ready light source to indicate that the tanker aircraft is not ready to couple with the receiver aircraft, or the indication system activates the waiting light source to indicate that the tanker aircraft is ready to couple with the receiver aircraft.

After the receiver aircraft couples to the tanker aircraft, the indication system activates the refueling light source to indicate that the receiver aircraft is in the refueling range and receiving fuel from the tanker aircraft. The indication system may flash the waiting light source to indicate that the receiver aircraft exceeded a minimum distance from the tanker aircraft or steadily activate the waiting light source to indicate that the receiver aircraft exceeded a maximum distance from the tanker aircraft (i.e., to indicate that the receiver aircraft is outside of the refueling range). In either scenario, the tanker aircraft immediately ceases supplying fuel to the receiver aircraft until the receiver aircraft maneuvers back into the refueling range. Also, in either scenario, the lights of the indication system provide no advanced warning to the receiver aircraft that it is approaching a boundary of the refueling range and should adjust its position to avoid an immediate shutoff of fuel supply.

To provide additional positional feedback to the receiver aircraft, the tanker aircraft may include markings at various locations on the hose. For example, the hose may include markings to indicate the boundaries of the refueling range. As such, the pilot of the receiver aircraft can determine the position of the receiver aircraft relative to the refueling range by observing a position of the markings relative to a housing of the tanker aircraft from which the hose extends. One drawback is that the pilot may be required to focus on both the hose markings and the lights of the indication system to receive both positional and operational feedback indications. Because the lights and the markings are in different locations, the pilot may repeatedly shift his or her focus between the different locations on the tanker aircraft during the refueling operation. This may present difficulties for the pilot in some instances.

Additionally, the visible light signals emitted by the indication system and the markings on the hose may be challenging for the pilot to observe when operating under low-light conditions such as, for example, during night operations and/or during inclement weather. To address low-light conditions, the tanker aircraft may include a separate set of infrared lights positioned immediately adjacent to the not-ready light source, the waiting light source, and the refueling light source. During low-light conditions, the receiver aircraft can use a night-vision imaging system (e.g., night-vision goggles) to observe when one of the infrared lights is activated. However, because the other infrared lights are not activated, the pilot is required to identify other points of reference on the tanker aircraft to try to determine the relative position of the activated infrared light and ascertain the indication being communicated. Under low-light conditions, it can be challenging to do so because it is often difficult for the pilot to accurately identify points of reference that can be used to determine the relative position of the activated light.

SUMMARY

In an example, an indication system for use with a refueling system is described. The refueling system includes a hose for supplying fuel to a receiver aircraft. The indication system includes a plurality of light sources including a not-ready light source, a waiting light source, and a plurality of refueling light sources. Each light source is configured to simultaneously emit visible light and infrared light. Each light source is operable at a dim setting and a bright setting. The indication system also includes a control system communicatively coupled with the plurality of light sources. The control system is configured to receive refueling data from the refueling system. The refueling data includes position data indicating a position of the receiver aircraft relative to the refueling system, ready-status data indicating whether the refueling system is ready to couple with the receiver aircraft or not ready to couple with the receiver aircraft, and fueling-status data indicating whether the refueling system is supplying fuel or not supplying fuel.

The control system is configured to: (i) when the refueling data indicates that the refueling system is not ready to couple with the receiver aircraft, activate the not-ready light source at the bright setting and activate the waiting light source and the plurality of refueling light sources at the dim setting, (ii) when the refueling data indicates that the position of the receiver aircraft is outside of a refueling range and the refueling system is ready to couple with the receiver aircraft, activate the waiting light source at the bright setting and activate the not-ready light source and the plurality of refueling light sources at the dim setting, and (iii) when the refueling data indicates that the position of the receiver aircraft is in the refueling range and the refueling system is supplying fuel to the receiver aircraft, activate at least one refueling light source of the plurality of refueling light sources at the bright setting and activate a remainder of the plurality of refueling light sources, the waiting light source, and the not-ready light source at the dim setting.

In another example, a refueling system includes a pod, and a hose extending from the pod and movable relative to the pod. The hose is configured to supply fuel to a receiver aircraft. The refueling system also includes a hose sensing system configured to (a) sense a condition of the hose and (b) generate, based on the sensed condition, refueling data. The refueling data includes position data indicating a position of the receiver aircraft relative to the refueling system, ready-status data indicating whether the refueling system is ready to couple with the receiver aircraft or not ready to couple with the receiver aircraft, and fueling-status data indicating whether the refueling system is supplying fuel or not supplying fuel. The refueling system further includes an indication system having a plurality of light sources including a not-ready light source, a waiting light source, and a plurality of refueling light sources. Each light source is configured to simultaneously emit visible light and infrared light. Each light source is operable at a dim setting and a bright setting.

The refueling system also includes a control system communicatively coupled with the plurality of light sources and the hose sensing system. The control system is configured to: (i) when the refueling data indicates that the refueling system is not ready to couple with the receiver aircraft, activate the not-ready light source at the bright setting and activate the waiting light source and the plurality of refueling light sources at the dim setting, (ii) when the refueling data indicates that the position of the receiver aircraft is outside of a refueling range and the refueling system is ready to couple with the receiver aircraft, activate the waiting light source at the bright setting and activate the not-ready light source and the plurality of refueling light sources at the dim setting, and (iii) when the refueling data indicates that the position of the receiver aircraft is in the refueling range and the refueling system is supplying fuel to the receiver aircraft, activate at least one refueling light source of the plurality of refueling light sources at the bright setting and activate a remainder of the plurality of refueling light sources, the waiting light source, and the not-ready light source at the dim setting.

In another example, a method for providing indications to a receiver aircraft during a refueling operation using an indication system of a refueling system is described. The indication system includes a plurality of light sources on a housing of a tanker aircraft. The plurality of light sources includes a not-ready light source, a waiting light source, and a plurality of refueling light sources. Each light source is configured to simultaneously emit visible light and infrared light. Each light source is operable at a bright setting and a dim setting.

The method includes determining refueling data including position data indicating a position of the receiver aircraft relative to the refueling system, ready-status data indicating whether the refueling system is ready to couple with the receiver aircraft or not ready to couple with the receiver aircraft, and fueling-status data indicating whether the refueling system is supplying fuel or not supplying fuel. The method further includes (i) when the refueling data indicates that the refueling system is not ready to couple with the receiver aircraft, activating the not-ready light source at the bright setting and activating the waiting light source and the plurality of refueling light sources at the dim setting, (ii) when the refueling data indicates that the position of the receiver aircraft is outside of a refueling range and the refueling system is ready to couple with the receiver aircraft, activating the waiting light source at the bright setting and activating the not-ready light source and the plurality of refueling light sources at the dim setting, and (iii) when the refueling data indicates that the position of the receiver aircraft is in the refueling range and the refueling system is supplying fuel to the receiver aircraft, activating at least one refueling light source of the plurality of refueling light sources at the bright setting and activating a remainder of the plurality of refueling light sources, the waiting light source, and the not-ready light source at the dim setting.

The features, functions, and advantages that have been discussed can be achieved independently in various embodiments or may be combined in yet other embodiments further details of which can be seen with reference to the following description and drawings.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying drawings, wherein:

FIG. 5A illustrates an arrangement of light sources for an indication system according to an example embodiment.

FIG. 5B illustrates another arrangement of light sources for an indication system according to an example embodiment.

FIG. 5C illustrates another arrangement of light sources for an indication system according to an example embodiment.

FIG. 5D illustrates another arrangement of light sources for an indication system according to an example embodiment.

DETAILED DESCRIPTION

Figure 1:
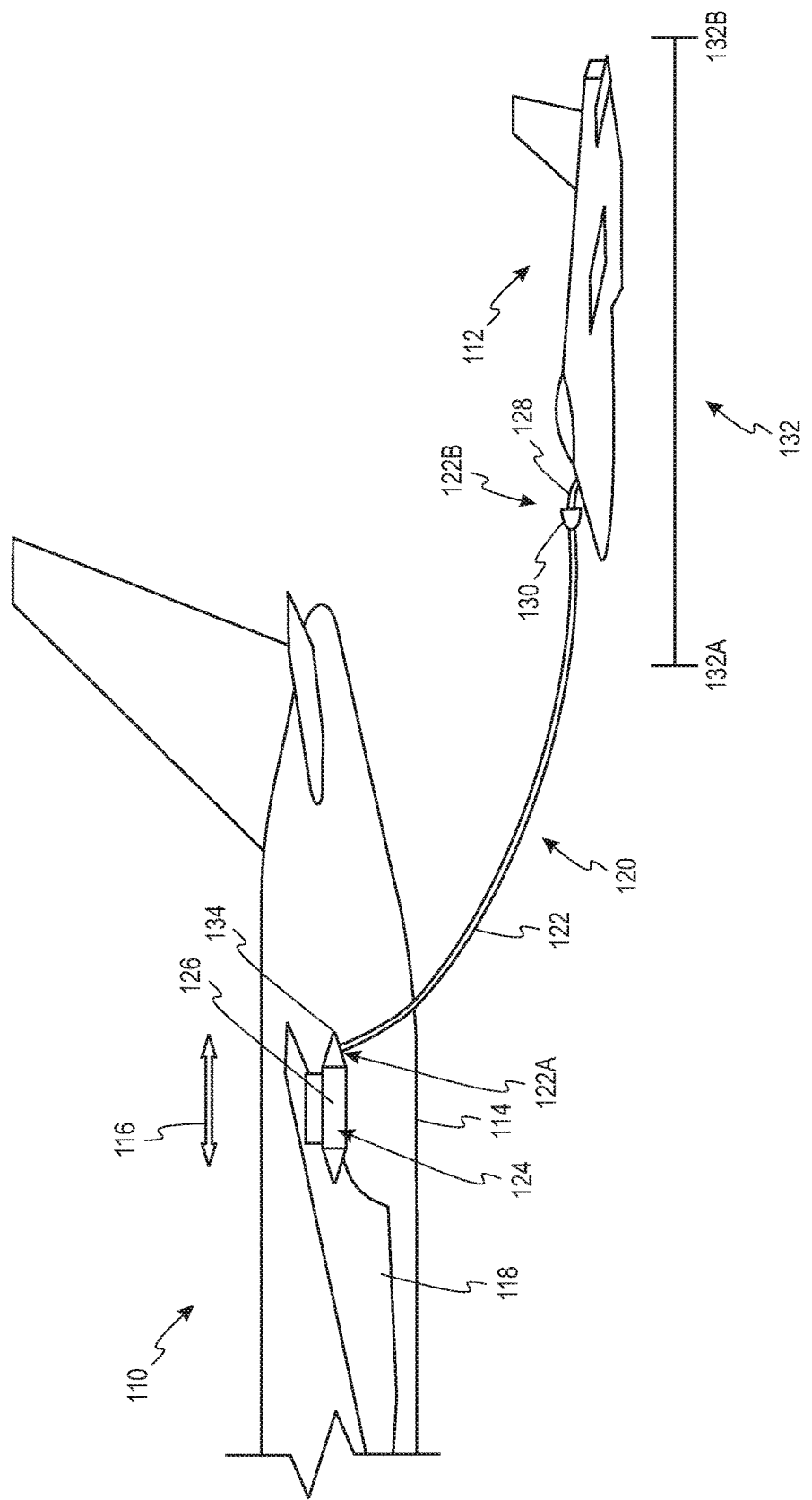
FIG. 1 illustrates a side view of a tanker aircraft and a receiver aircraft according to an example embodiment.

Disclosed embodiments will now be described more fully hereinafter with reference to the accompanying drawings, in which some, but not all of the disclosed embodiments are shown. Indeed, several different embodiments may be described and should not be construed as limited to the embodiments set forth herein. Rather, these embodiments are described so that this disclosure will be thorough and complete and will fully convey the scope of the disclosure to those skilled in the art.

Example systems and methods described herein can beneficially address at least some drawbacks of existing aerial refueling systems. Within the examples described herein, a refueling system includes an indication system having a plurality of light sources. Each light source is configured to simultaneously emit visible light and infrared light. Additionally, each light source is operable in a bright setting and a dim setting. During an aerial refueling operation, the refueling system determines one or more conditions relating to the refueling operation and, based on the determined condition(s), the indication system can selectively activate at least one of the light sources at the bright setting while activating the remaining light sources at the dim setting to provide indications of positional and operational feedback to the receiver aircraft.

The light sources can include a not-ready light source, a waiting light source, and/or a plurality of refueling light sources. The indication system can activate the not-ready light source at the bright setting to indicate that the refueling system is not ready to couple with the receiver aircraft. The indication system can activate the waiting light source at the bright setting to indicate that the refueling system is ready to couple with the receiver aircraft. The indication system can activate at least one of the refueling light sources at the bright setting to indicate that the refueling system is supplying fuel to the receiver aircraft.

Additionally, each of the refueling light sources can correspond to a different position and/or sub-range of positions within the refueling range. As such, the refueling light sources can indicate a specific position or position range of the receiver aircraft within the refueling range by selectively activating the refueling light source that corresponds to the specific position of the receiver aircraft. This may allow the receiver pilot to anticipate when the receiver aircraft is approaching a boundary of the refueling range and responsively make adjustments to avoid moving outside of the refueling range. Additionally, because the light sources provide both operational indications (e.g., ready, not ready, fuel being supplied, etc.) and positional indications (e.g., a position of the receiver aircraft within the refueling range), the pilot of the receiver aircraft can more easily ascertain the indications without having to repeatedly shift his or her focus between the hose and the light sources.

Because the light sources simultaneously emit light in the visible and infrared wavelength ranges when activated, the receiver pilot can receive the indications in daylight and low-light conditions. As such, a single set of light sources can facilitate refueling operations in both overt mode (i.e., for daylight conditions) and covert mode (i.e., for low-light conditions) of operation. This provides the indication system with operational versatility and also helps to reduce or avoid interruptions to the refueling operation. For example, in a scenario in which a night-vision imaging system (e.g., night-vision goggles (NVGs)) has an operational transient, a pilot of the receiver aircraft can remove the night-vision imaging system to view the indications in the visible light spectrum without interruption to the refueling operation.

Additionally, because the indication system provides each indication to the receiver aircraft by selectively activating each light source at either the bright setting or the dim setting, the light sources activated at the dim setting provide reference points for ascertaining which of the light sources is activated at the bright setting for the indication. As such, the light source activated at the bright setting can be readily identified by the pilot of the receiver aircraft. This may be particularly beneficial when the pilot of the receiver aircraft uses a night-vision imaging system, which causes the infrared light emitted by all of the light sources to appear to be the same color light (i.e., monochromatic such as, for example, a green color). These and other benefits are described in further detail below.

FIG. 1 depicts a partial side view of a tanker aircraft 110 and a receiver aircraft 112 during an aerial refueling operation according to an example embodiment. As shown in FIG. 1, the tanker aircraft 110 includes a fuselage 114 that extends in a longitudinal direction 116, and an aircraft wing 118 that extends from the fuselage 114 in a transverse direction relative to the longitudinal direction 116.

The tanker aircraft 110 also includes a refueling system 120 that is operable to refuel the receiver aircraft 112 in-flight. The refueling system 120 includes a flexible hose 122 that extends from a housing 124 and is movable relative to the housing 124. In FIG. 1, the housing 124 is a pod 126, which is coupled to the aircraft wing 118. Although FIG. 1 depicts a single pod 126 on the wing 118, the tanker aircraft 110 can include one or more pods 126 on the wing 118 and/or another wing on an opposite side of the fuselage 114 of the tanker aircraft 110 in additional or alternative examples. By providing a pod 126 on each of the wings 118, the tanker aircraft 110 can refuel multiple receiver aircraft 112 at the same time. Additionally or alternatively, as described below with reference to FIG. 4, the housing 124 from which the hose 122 extends can be provided by a lower portion of the fuselage 114 in other examples.

The hose 122 is configured supply fuel to the receiver aircraft 112. For example, the hose 122 can have (i) a first end 122A in the housing 124 for receiving the fuel from a fuel tank in the tanker aircraft 110 and (ii) a second end 122B trailing below and aft of the tanker aircraft 110 for coupling with a probe 128 of the receiver aircraft 112. The second end 122B of the hose 122 can include a drogue 130 to stabilize the hose 122 during flight and align the probe 128 to aid in coupling the probe 128 to the hose 122. For example, the drogue 130 can have a conical shape to assist in stabilizing the hose 122 and coupling the hose 122 with the probe 128.

In FIG. 1, the receiver aircraft 112 is in a position that is below and aft of a rear portion of the fuselage 114 of the tanker aircraft 110. This may mitigate or avoid potentially dangerous turbulence and disturbances in air flow created by, for instance, control surfaces and engines of the tanker aircraft 110. Additionally, in FIG. 1, the receiver aircraft 112 is shown within a refueling range 132 of the refueling system 120. The refueling range 132 can be a range of positions, between a first-boundary position 132A representing a minimum distance from the refueling system 120 and a second-boundary position 132B representing a maximum distance from the refueling system 120, at which the refueling system 120 can supply fuel to the receiver aircraft 112. The refueling system 120 may not supply fuel to the receiver aircraft 112 when the receiver aircraft 112 is outside of the refueling range 132. In one example, the refueling range 132 spans a distance of approximately 20 feet (ft) (6.1 meters (m)) between the first-boundary position 132A and the second-boundary position 132B.

The refueling system 120 also includes an indication system 134 for providing indications to the receiver aircraft 112 relating to the aerial refueling operation. For example, the indication system 134 is configured to indicate to the receiver aircraft 112 whether the refueling system 120 is ready to couple with the receiver aircraft 112 or not ready to couple with the receiver aircraft 112, whether the receiver aircraft 112 is positioned in the refueling range 132 or outside of the refueling range 132, a position of the receiver aircraft 112 in the refueling range 132 relative to the first-boundary position 132A and the second-boundary position 132B, and/or whether the refueling system 120 is supplying fuel to the receiver aircraft 112.

Figure 2:
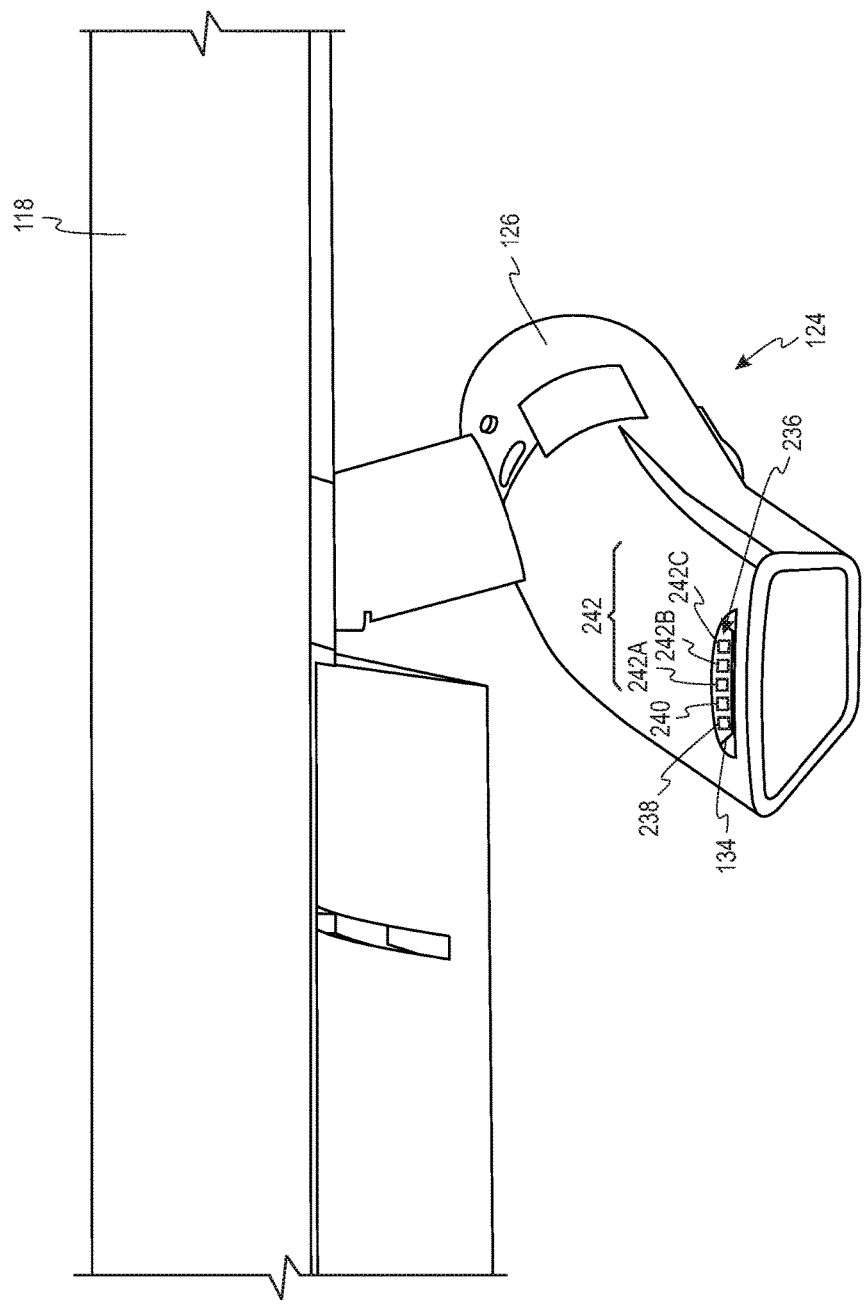
FIG. 2 illustrates an indication system according to an example embodiment.

FIG. 2 depicts the indication system 134 on the housing 124 of the pod 126 according to an example embodiment. As shown in FIG. 2, the indication system 134 has a plurality of light sources 236, including a not-ready light source 238, a waiting light source 240, and a plurality of refueling light sources 242. In an example, the not-ready light source 238 can indicate that the refueling system 120 is not ready to couple with the receiver aircraft 112, the waiting light source 240 can indicate that the receiver aircraft 112 is positioned outside of the refueling range 132 and the refueling system 120 is ready to couple with the receiver aircraft 112, and the refueling light sources 242 can indicate that the refueling system 120 is supplying fuel and a position of the receiver aircraft 112 within the refueling range 132.

As shown in FIG. 2, the refueling light sources 242 include at least a first refueling light source 242A, a second refueling light source 242B, and a third refueling light source 242C. Each refueling light source 242A-242C can correspond to a different position or range of positions within the refueling range 132. By providing multiple refueling light sources 242A-242C, the indication system 134 can indicate the relative position of the receiver aircraft 112 within the refueling range 132 so that the pilot of receiver aircraft 112 can determine when the receiver aircraft 112 is approaching the first-boundary position 132A and/or the second-boundary position 132B of the refueling range 132.

Each light source 236 is configured to simultaneously emit visible light and infrared light when activated. For example, each light source 236 can include a light-emitting diode (LED) that simultaneously generates electromagnetic radiation in the visible light spectrum (i.e., at a wavelength of about 380 nm to about 700 nm) and the infrared light spectrum (i.e., at a wavelength of about 700 nm to about 1 mm) when activated. This type of light source may also be referred to as an "infrared dual emitter" or an "infrared dual LED".

By simultaneously emitting visible light and infrared light, each light source 236 can provide indications that can be readily received and determined by the receiver aircraft 112 in daylight, low-light, and low-visibility conditions. Additionally, for example, because the light sources 236 simultaneously emit visible light and infrared light, there is no need for the tanker aircraft 110 to be informed as to whether the receiver aircraft 112 is using a night-vision imaging system to receive the indications. As such, if an issue arises with the night-vision imaging system of the receiver aircraft 112, the pilot of the receiver aircraft 112 can remove the night-vision imaging system and continue to receive indications in the visible spectrum without interrupting the aerial refueling operation.

In an example, the waiting light source 240 is operable to emit the visible light in a first wavelength range, the not-ready light source 238 is operable to emit the visible light in a second wavelength range, and each of the refueling light sources 242 is operable to emit the visible light in a third wavelength range, where the first wavelength range, the second wavelength range, and the third wavelength range are different than each other. By activating the light sources 236 at different wavelength ranges, the visible light emitted by the light sources 236 can be visually distinguishable from each other. For instance, in one implementation, the first wavelength range is provides amber light (e.g., approximately 570 nm to approximately 620 nm), the second wavelength range provides red light (e.g., approximately 620 nm to approximately 700 nm), and the third wavelength range provides green light (e.g., approximately 495 nm to approximately 570 nm). Each light source 238, 240, and 242 can also emit infrared light in an infrared wavelength range simultaneously with the visible light in the respective first, second, or third wavelength range. In particular embodiments, at least one light source 238, 240, and/or 242 can emit only visible light or emit only infrared light.

Each light source 236 is operable at a dim setting and a bright setting. In one example, for each light source 236, an intensity of the visible light and/or the infrared light emitted by the light source 236 at the bright setting is greater than an intensity of the visible light and/or the infrared light emitted by the light source 236 at the dim setting by at least factor of two. In another example, for each light source 236, an intensity of the visible light and/or the infrared light emitted by the light source 236 at the bright setting is greater than an intensity of the visible light and/or the infrared light emitted by the light source 236 at the dim setting by a factor between approximately 1.5 and approximately 10.0. More generally, the intensity of the light emitted by each light source 236 at the bright setting differs from the intensity of the light emitted by the light source 236 at the dim setting such that the receiver aircraft 112 (or a pilot thereof) can visually distinguish the light source 236 activated at the bright setting from the light sources 236 activated at the dim setting.

Figure 3:
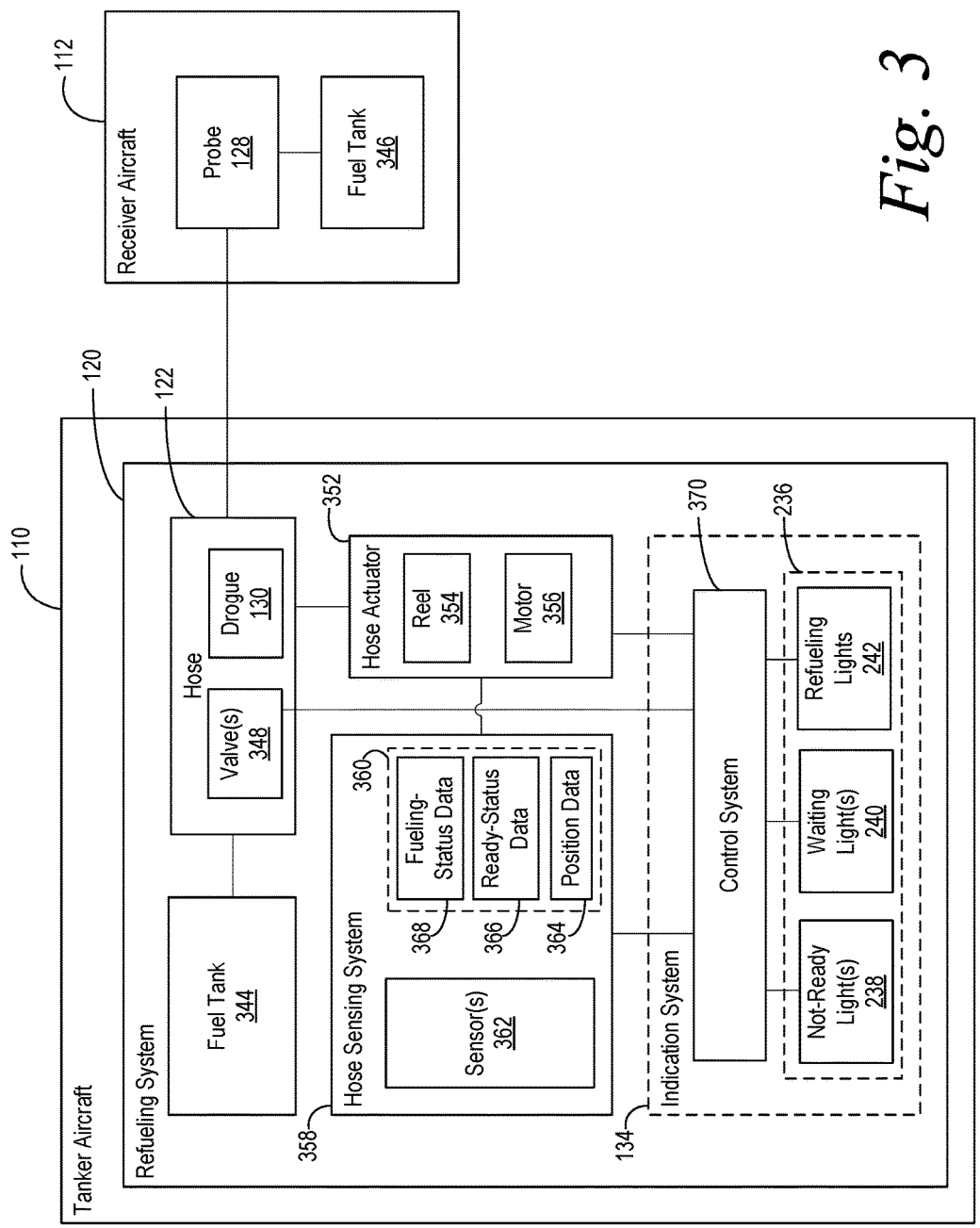
FIG. 3 illustrates a simplified block diagram of a tanker aircraft and a receiver aircraft according to an example embodiment.

FIG. 3 depicts a simplified block diagram including additional components of the tanker aircraft 110 and the receiver aircraft 112 according to an example embodiment. As shown in FIG. 3, the refueling system 120 includes a fuel tank 344 that stores fuel to be supplied to the receiver aircraft 112. The fuel tank 344 is coupled to the hose 122, which can be coupled to the probe 128 of the receive aircraft 112 (e.g., as shown in FIG. 1). The probe 128 is coupled to a fuel tank 346 of the receiver aircraft 112. In this way, when the probe 128 is inserted in the drogue 130 and coupled to the hose 122 during an aerial refueling operation, the hose 122 and the probe 128 can provide a fluid path for the fuel to flow from the fuel tank 344 of the tanker aircraft 110 to the fuel tank 346 of the receiver aircraft 112.

To control the flow of fuel from the tanker aircraft 110 to the receiver aircraft 112, the refueling system 120 can include one or more valve(s) 348 along the flow path. For example, in FIG. 3, the hose 122 includes the valve(s) 348; however, the valve(s) 348 can be separate from the hose 122 in additional or alternative examples. In one implementation, the valve(s) 348 are operable to start and stop the flow of fuel, and/or to increase and decrease a pressure of fuel flow through the hose 122.

As also shown in FIG. 3, the refueling system 120 includes a hose actuator 352. The hose actuator 352 can move the hose 122 relative to the housing 124 to extend the hose 122 from the housing 124 and/or retract the hose 122 into the housing 124. As one example, the hose actuator 352 can include a reel 354 on which the hose 122 is wound, and a motor 356 operable to rotate the reel 354 to extend and retract the hose 122. The reel 354 can be mounted within the housing 124 of the pod 126 and/or, as described below, the housing 124 in the fuselage 114 of the tanker aircraft 110. More generally, the hose actuator 352 is configured to control a position of the hose 122 relative to the housing 124 by controlling an amount of the hose 122 that extends from the housing 124.

The refueling system 120 further includes a hose sensing system 358. The hose sensing system 358 is configured to (i) sense a condition of the hose 122 and (ii) generate, based on the sensed condition, refueling data 360. To sense the condition, the hose sensing system 358 includes one or more sensors 362. In an example, the condition sensed by the sensor(s) 362 can include (i) whether the probe 128 of the receiver aircraft 112 is coupled to the hose 122 of the tanker aircraft 110, (ii) whether the hose 122 is supplying fuel from the tanker aircraft 110 to the receiver aircraft 112, (iii) a pressure of the fuel supplied by the hose 122 to the receiver aircraft 112, (iv) a position of the hose 122 relative to the housing 124, (v) a change in the position of the hose 122 responsive to a change in the position of the receiver aircraft 112, and/or (vi) a tension on the hose 122 when the hose 122 is coupled to the probe 128 of the receiver aircraft 112.

The refueling data 360 generated by the hose sensing system 358 can include, for example, position data 364 indicating a position of the receiver aircraft 112 relative to the refueling system 120. For instance, when the sensor(s) 362 sense that the probe 128 is coupled to the hose 122, the position of the hose 122 is indicative of the position of the receiver aircraft 112. As such, the hose sensing system 358 can determine the position data 364 based on the position of the hose 122 relative to the housing 124 sensed by the sensor(s) 362.

The refueling data 360 generated by the hose system 358 can also include ready-status data 366 indicating whether the refueling system 120 is ready to couple with the receiver aircraft 112 or not ready to couple with the receiver aircraft 112. In one example, the ready-status data 366 can indicate that the refueling system 120 is not ready to couple with the receiver aircraft 112 when the sensor(s) 362 sense (i) a fault condition and/or a mechanical failure of one or more components of the refueling system 120 has occurred, and/or (ii) the hose 122 is not in a position within the refueling range 132 (e.g., while the hose 122 is initially extended from the housing 124). Whereas, the ready-status data 366 can indicate that the refueling system 120 is ready to couple with the receiver aircraft 112 when sensor(s) 362 sense that the hose 122 is in a position within the refueling range 132 and the sensor(s) 362 do not sense a fault condition or mechanical failure of the component(s) of the refueling system 120. In an example implementation, the sensor(s) 362 can sense a fault condition and/or mechanical failure by sensing a fuel pressure in the hose 122 and/or a tension on the hose 122 that is above a threshold value, below a threshold value, and/or outside a predetermined range of threshold values.

In another example, the ready-status data 366 can indicate that the refueling system 120 is not ready to couple with the receiver aircraft 112 responsive to an operator of the tanker aircraft 110 providing a user input to the hose sensing system 358. Other examples are also possible.

The refueling data 360 generated by the hose system 358 can also include fueling-status data 368 indicating whether the refueling system 120 is supplying fuel or not supplying fuel. For example, the sensor(s) 362 can sense a state of the valve(s) 348, a pressure of the fuel in the hose 122, and/or whether the hose 122 is coupled to the probe 128 to generate the fueling-status data 368.

As shown in FIG. 3, the hose sensing system 358 is communicatively coupled to the hose actuator 352. In an example, when the probe 128 of the receiver aircraft 112 is coupled with the hose 122 of the tanker aircraft 110, the hose actuator 352 can be configured to adjust the position of the hose 122 responsive to a movement of the receiver aircraft 112. For instance, the sensor(s) 362 can sense the tension on the hose 122 and the hose actuator 352 can responsively move the hose 122 to maintain the tension within a predetermined range of tension values while the receiver aircraft 112 is coupled to the refueling system 120.

Also, as shown in FIG. 3, the hose sensing system 358 of the refueling system 120 is further communicatively coupled to the indication system 134. The indication system 134 includes a control system 370 communicatively coupled with the plurality of light sources 236. In general, the control system 370 is a computing device that is configured to control operation of the refueling system 120. As such, the control system 370 can be implemented using hardware, software, and/or firmware. For example, the control system 370 can include one or more processors and a non-transitory computer readable medium (e.g., volatile and/or non-volatile memory) that stores machine language instructions or other executable instructions. The instructions, when executed by the one or more processors, cause the refueling system 120 to carry out the various operations described herein. The control system 370, thus, can receive data (including the refueling data 360) and store the data in memory as well.

More particularly, the control system 370 is configured to receive the refueling data 360 from the refueling system 120, and responsively activate at least one of the light sources 236 at the bright setting and the remaining light sources 236 at the dim setting (e.g., by transmitting control signals to the light sources 236). For example, the control system 370 can be configured to, when the refueling data 360 indicates that the refueling system 120 is not ready to couple with the receiver aircraft 112, activate the not-ready light source 238 at the bright setting and activate the waiting light source 240 and the plurality of refueling light sources 242 at the dim setting. Additionally, for example, the control system 370 can be configured to, when the refueling data 360 indicates that the position of the receiver aircraft 112 is outside of the refueling range 132 and the refueling system 120 is ready to couple with the receiver aircraft 112, activate the waiting light source 240 at the bright setting and activate the not-ready light source 238 and the plurality of refueling light sources 242 at the dim setting.

Additionally or alternatively, the control system 370 can be configured to, when the refueling data 360 indicates that the position of the receiver aircraft 112 is in the refueling range 132 and the refueling system 120 is supplying fuel to the receiver aircraft 112, activate at least one refueling light source 242A, 242B, or 242C of the plurality of refueling light sources 242 at the bright setting and activate a remainder of the plurality of refueling light sources 242, the waiting light source 240, and the not-ready light source 238 at the dim setting. To activate any of the light sources 236, the control system 370 can send a signal to the light sources 236 to power on the light sources 236.

In an implementation, the control system 370 can be configured to select, based on the position data 364, the at least one refueling light source 242A, 242B, 242C from among the plurality of refueling light sources 242. For example, the refueling range 132 can include a plurality of sub-ranges, and each refueling light source 242 can correspond to a respective one of the plurality of sub-ranges. In this example, to select the at least one refueling light source 242A, 242B, 242C, the control system 370 can be configured to (i) determine that the position data 364 indicates that the receiver aircraft 112 is in one sub-range of the plurality of sub-ranges, and (ii) select the refueling light source 242A, 242B, 242C corresponding to the determined one sub-range as the at least one refueling light source 242A, 242B, 242C to activate at the bright setting. Accordingly, based on the refueling light source 242 that is activated at the bright setting, the receiver aircraft 112 can determine its position within the refueling range 132 relative to the first-boundary position 132A and the second-boundary position 132B.

Figure 4:
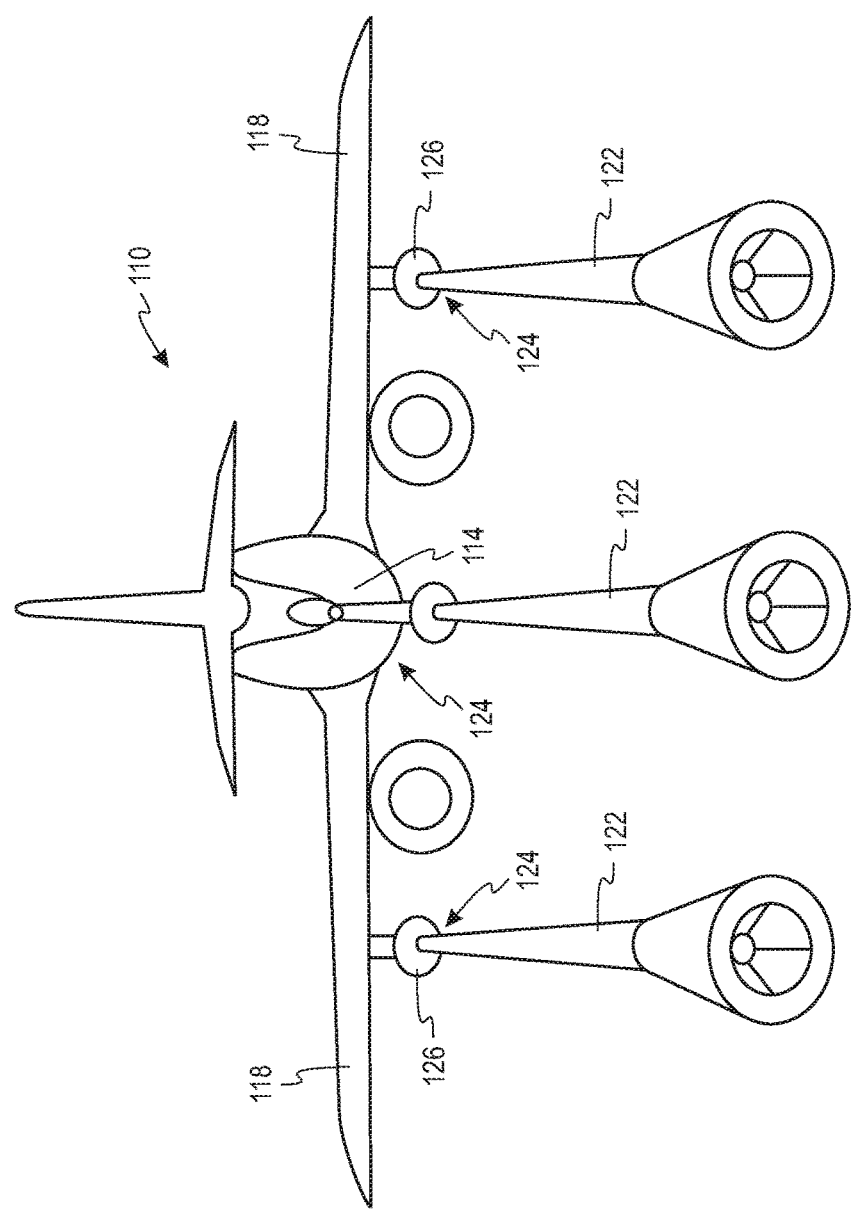
FIG. 4 illustrates a rear view of a tanker aircraft according to an example embodiment.

As described above, in FIGS. 1-2, the hose 122 extends from the housing 124, which is in the form of the pod 126 coupled to the aircraft wing 118. In additional or alternative examples, the housing 124 from which the hose 122 extends can include a lower portion of the fuselage 114 and/or one or more pods 126 coupled to the wings 118. FIG. 4 depicts a rear view of the tanker aircraft 110 according to one example. As shown in FIG. 4, the tanker aircraft 110 includes a pod 126 on each wing 118. The tanker aircraft 110 further includes a hose 122 extending from each pod 126 and the fuselage 114. In FIG. 4, the housing 124 of the refueling system 120 thus includes the pods 126 and/or the fuselage 114. By providing multiple hoses 122, the tanker aircraft 110 can be configured to refuel multiple receiver aircraft 112 at the same time.

In one alternative example, the tanker aircraft 110 can include a flying-boom refueling system extending from the fuselage 114 and one or more hose-and-drogue systems extending from one or more pods 126. In this alternative example, the pod(s) 126 can provide the tanker aircraft 110 with a versatility to refuel different types of receiver aircraft 112, which may be compatible with only one of the flying-boom system or the hose-and-drogue system of the tanker aircraft 110.

FIGS. 5A-5D depict various arrangements of the plurality of light sources 236 according to example embodiments. In FIG. 5A, the light sources 236 are arranged in a horizontal, linear pattern on the housing 124 of the pod 126. In FIG. 5B, the light sources 236 are arranged in a vertical, linear pattern on the housing 124 of the pod 126. In FIG. 5C, the light sources 236 are arranged in an arcing contour that corresponds to an arcing contour of the housing 124 of the pod 126. In FIG. 5D, the light sources 236 are arranged with arcing contours on opposing sides of the housing 124. Other example arrangements are also possible.

Although the indication system 134 depicted in FIGS. 2-5C includes five light sources 236, the indication system 134 can include a greater quantity of light sources 236 or a lesser quantity of light sources 236 in other examples. For instance, in additional or alternative examples, the waiting light source 240 can include a plurality of waiting light sources 240 and/or the not-ready light source 238 can include a plurality of not-ready light sources 238. Further, in additional or alternative examples, the refueling light sources 242 can include N refueling light sources 242, where N is an integer value that is greater than or equal to two (e.g., N=2, 3, 4, 5, 6, 7, etc.). As the quantity of refueling light sources 242 increases, the indication system 134 can provide positional feedback to the receiver aircraft 112 with greater granularity.

FIGS. 6A-6E depict various stages of an aerial refueling operation according to an example embodiment. The aerial refueling operation begins with the tanker aircraft 110 preparing the refueling system 120 for coupling with the receiver aircraft 112. For example, in FIG. 6A, the tanker aircraft 110 prepares the refueling system 120 by extending the hose 122 and the drogue 130 from the housing 124. Due to aerodynamic forces, the hose 122 and the drogue 130 trail behind the tanker aircraft 110 below and aft of the fuselage 114.

Figure 6A:
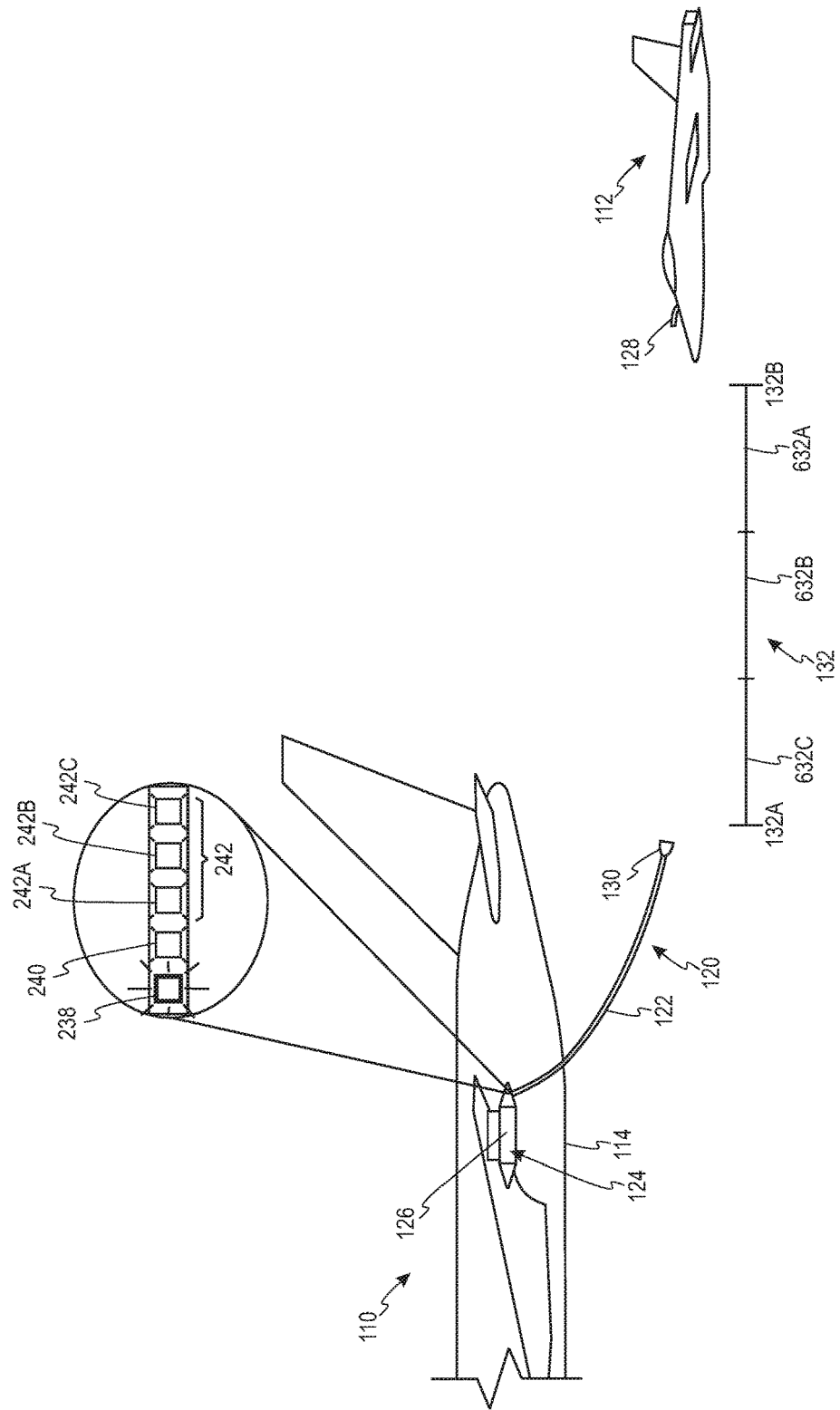
FIG. 6A illustrates a stage of a refueling operation according to an example embodiment.

While initially extending the hose 122 and/or otherwise preparing the refueling system 120, the hose sensing system 358 can sense the condition(s) of the hose 122, generate the refueling data 360 based on the sense condition(s), and communicate the refueling data 360 to the control system 370. In FIG. 6A, the refueling data 360 indicates that the refueling system 120 is not ready to couple with the receiver aircraft 112. Accordingly, as shown in FIG. 6A, when the refueling data 360 indicates that the refueling system 120 is not ready to couple with the receiver aircraft 112, the control system 370 activates the not-ready light source 238 at the bright setting and activates the waiting light source 240 and the refueling light sources 242 at the dim setting. The receiver aircraft 112 receives the indication provided by the light sources 238, 240, 242 and responsively does not attempt to couple with the tanker aircraft 110.

Figure 6B:
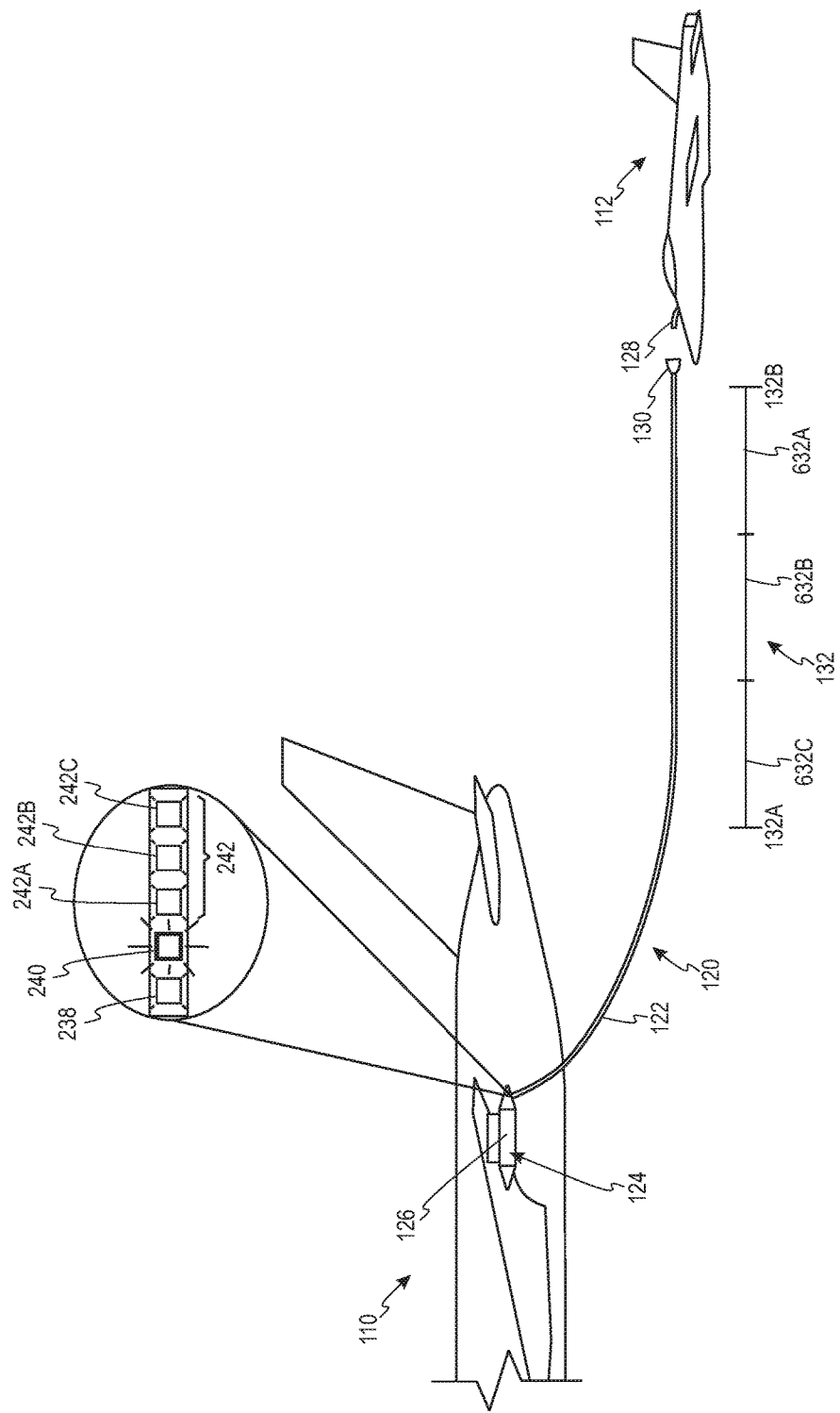
FIG. 6B illustrates another stage of the refueling operation according to the example embodiment.

In FIG. 6B, the hose actuator 352 has completed extending the hose 122 and the drogue 130 to a position at which the refueling system 120 is ready to couple to the receiver aircraft 112, the receiver aircraft 112 remains outside of the refueling range 132, and the receiver aircraft 112 is not coupled to the refueling system 120. The hose sensing system 358 senses these conditions, generates the refueling data 360 based on the sensed conditions, and communicates the refueling data 360 to the control system 370.

In FIG. 6B, the refueling data 360 now indicates that the receiver aircraft 112 is at a position outside of the refueling range 132 and the refueling system 120 is ready to couple with the receiver aircraft 112. Accordingly, as shown in FIG. 6B, when the refueling data 360 indicates that the position of the receiver aircraft 112 is outside of the refueling range 132 and the refueling system 120 is ready to couple with the receiver aircraft 112, the control system 370 activates the waiting light source 240 at the bright setting and activates the not-ready light source 238 and the refueling light sources 242 at the dim setting.

Responsive to this indication from the light sources 238, 240, 242, the receiver aircraft 112 maneuvers into a position such that the probe 128 enters into the drogue 130 and couples with the hose 122. After coupling with the hose 122, the receiver aircraft 112 can continue to urge the hose 122 and the drogue 130 forward relative to the refueling system 120 until the receiver aircraft 112 is in the refueling range 132. As the receiver aircraft 112 moves forward, the hose actuator 352 can responsively retract the hose 122 to take up the slack in the hose 122. Additionally, after the receiver aircraft 112 moves the hose 122 forward by a predetermined distance after initial contact, the refueling system 120 starts supplying fuel to the receiver aircraft 112. In one example, the predetermined distance can be approximately five feet to approximately 10 feet.

Figure 6C:
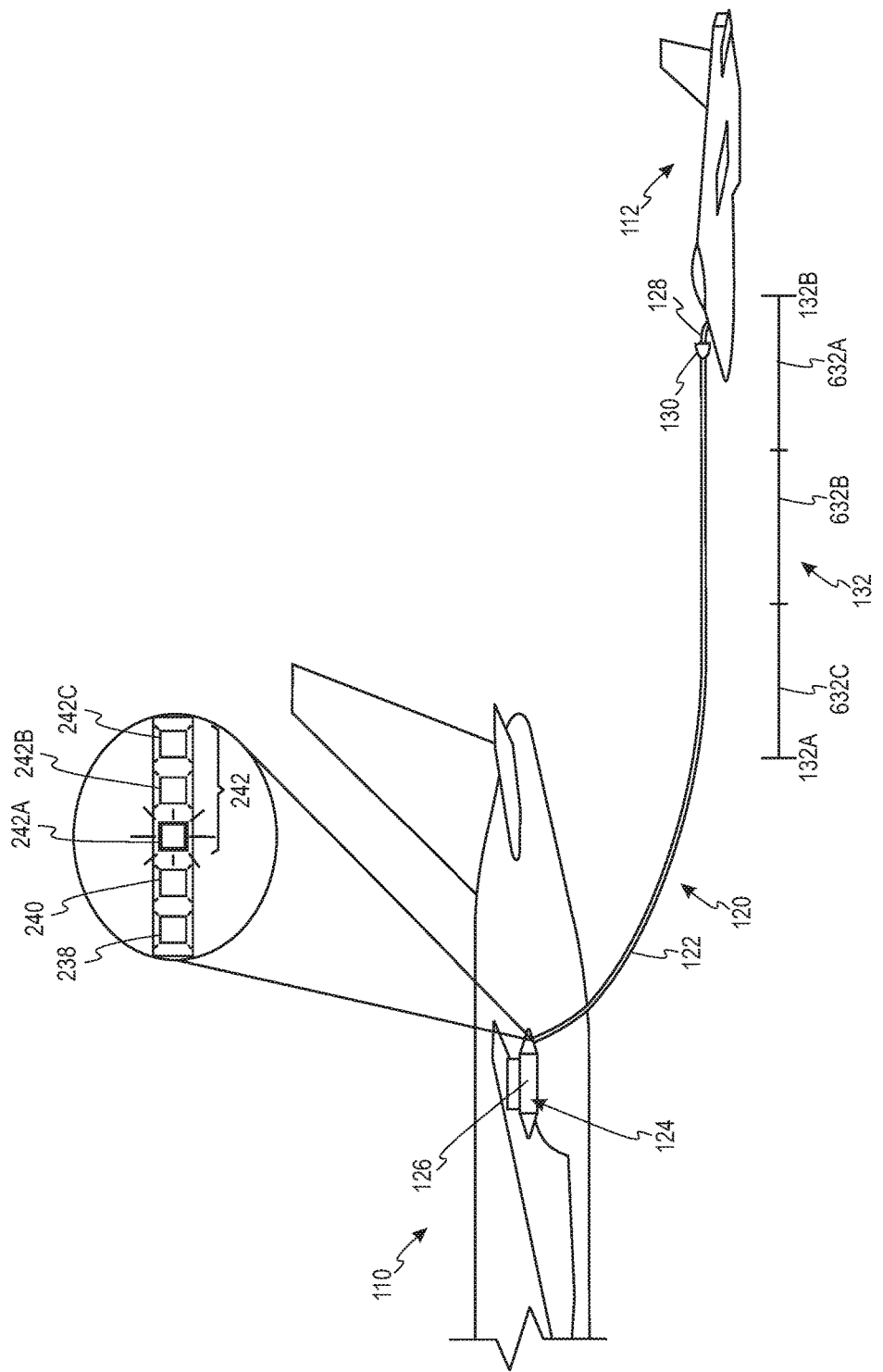
FIG. 6C illustrates another stage of the refueling operation according to the example embodiment.

In FIG. 6C, the receiver aircraft 112 has coupled to the refueling system 120 and moved the hose 122 forward by the predetermined distance such that that the receiver aircraft 112 is in the refueling range 132. As such, in FIG. 6C, the refueling system 120 is supplying fuel to the receiver aircraft 112. The hose sensing system 358 senses these conditions, generates the refueling data 360 based on the sensed conditions, and communicates the refueling data 360 to the control system 370. As shown in FIG. 6C, when the refueling data 360 indicates that the receiver aircraft 112 is in the refueling range 132 and the refueling system 120 is supplying fuel to the receiver aircraft 112, the control system 370 activates one of the refueling light sources 242A at the bright setting and activates the not-ready light source 238, the waiting light source 240, and the remaining refueling light sources 242B, 242C at the dim setting.

The control system 370 select the at least one refueling light source 242A from among the plurality of refueling light sources 242 based, at least in part, on the position data 364 of the refueling data 360. For example, in FIGS. 6A-6E, the refueling range 132 includes a plurality of sub-ranges 632A, 632B, 632C, and each refueling light source 242A, 242B, 242C corresponds to a respective one of the plurality of sub-ranges 632A, 632B, 632C. In FIGS. 6A-6E, for example, the first refueling light source 242A corresponds to a first sub-range 632A, the second refueling light source 242B corresponds to a second sub-range 632B, and the third refueling light source 242C corresponds to a third sub-range 632C. In this example, the plurality of refueling light sources 242A, 242B, 242C are positioned on the housing 124 of the refueling system 120 in an order that is the same as an order of the corresponding sub-ranges 632A, 632B, 632C in the refueling range 132.

To select the at least one refueling light source 242, the control system 370 can determine that the position data 364 indicates that the receiver aircraft 112 is in one sub-range of the plurality of sub-ranges 632A, 632B, 632C, and select the refueling light source 242 corresponding to the determined one sub-range as the at least one refueling light source 242 to activate at the bright setting. In FIG. 6C, the receiver aircraft 112 is in the first sub-range 632A and, thus, the control system 370 selects the first refueling light source 242A as the at least one refueling light source 242 to activate at the bright setting.

Figure 6D:
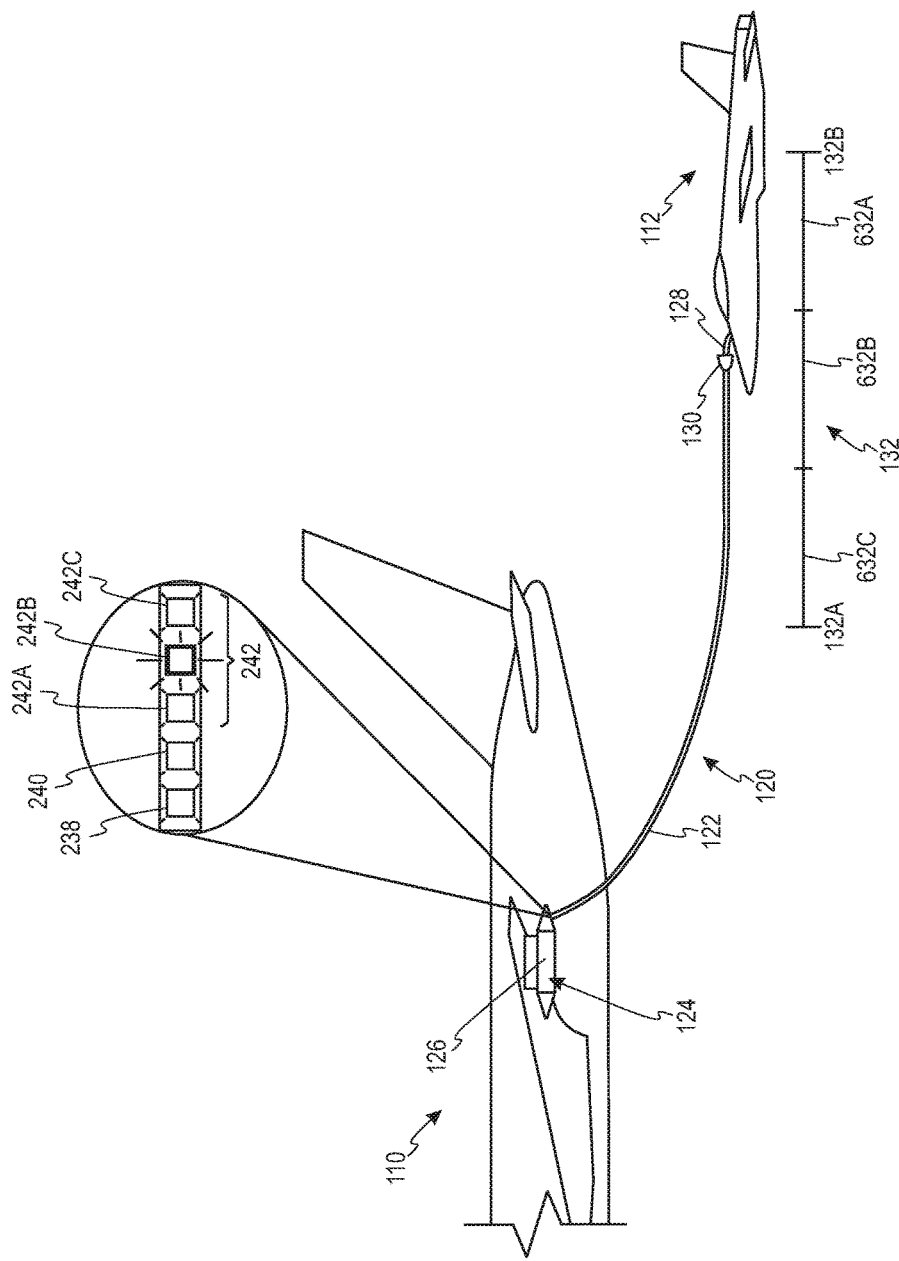
FIG. 6D illustrates another stage of the refueling operation according to the example embodiment.
Figure 6E:
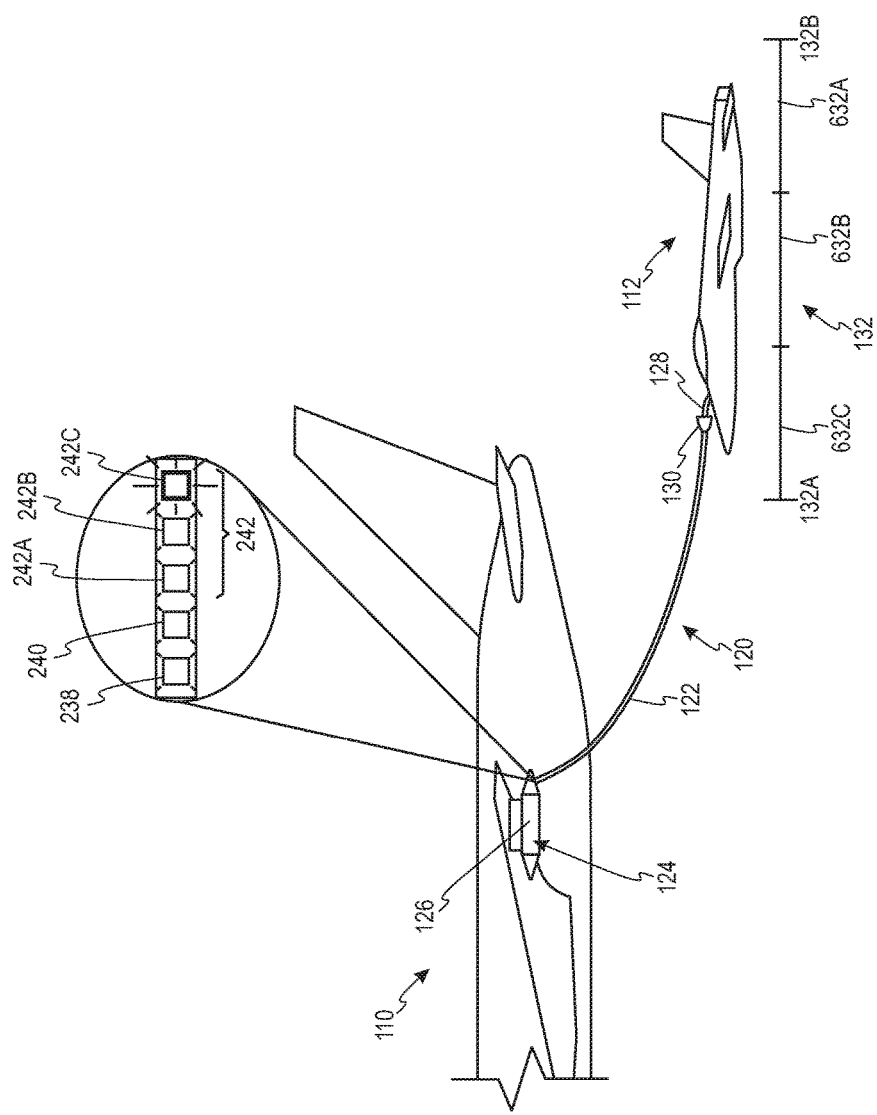
FIG. 6E illustrates another stage of the refueling operation according to the example embodiment.

In FIG. 6D, the receiver aircraft 112 has moved from the first sub-range 632A to the second sub-range 632B while the refueling system 120 continues to supply fuel to the receiver aircraft 112. Accordingly, in FIG. 6D, the control system 370 selects the second refueling light source 242B as the at least one refueling light source 242 to activate at the bright setting. In FIG. 6E, the receiver aircraft 112 has moved from the second sub-range 632B to the third sub-range 632C while the refueling system 120 continues to supply fuel to the receiver aircraft 112. Accordingly, in FIG. 6E, the control system 370 selects the third refueling light source 242C as the at least one refueling light source 242 to activate at the bright setting.

In one implementation, when the receiver aircraft 112 receives an indication that the receiver aircraft 112 is position in the first sub-range 632A or the third sub-range 632C, the receiver aircraft 112 can responsively move to a position in the second sub-range 632B. In this way, the receiver aircraft 112 can reduce or eliminate the risk that fuel is cutoff due to the receiver aircraft straying outside of the refueling range 132.

Although FIGS. 6A-6E depict an example in which the refueling range 132 includes three sub-ranges 632A, 632B, 632C and the indication system 134 includes three corresponding refueling light sources 242A, 242B, 242C, the refueling range 132 can include more than three sub-ranges 632A, 632B, 632C and the indication system can include more than three refueling light sources 242 in additional or alternative examples. Additionally, although each of the first sub-range 632A, the second sub-range 632B, and the third sub-range 632C are equal in size, the sub-ranges 632A, 632B, 632C can have different sizes in alternative examples. For instance, the first sub-range 632A and the third sub-range 632B can have a smaller size than the second sub-range 632B in one alternative example. The second sub-range 632B can thus correspond to a relatively greater range of positions for the receiver aircraft 112, which provides a target range of positions within the refueling range 132. Whereas the first sub-range 632A and the third sub-range 632C can correspond to a relatively smaller range of positions at which the receiver aircraft 112 is warned to adjust its position away from the boundaries of the refueling range 132.

As described above, the control system 370 can be configured to, when the refueling data 360 indicates that the position of the receiver aircraft 112 is in the refueling range 132 and the refueling system 120 is supplying fuel to the receiver aircraft 112, activate at least one refueling light source 242A, 242B, or 242C of the plurality of refueling light sources 242 at the bright setting and activate a remainder of the plurality of refueling light sources 242, the waiting light source 240, and the not-ready light source 238 at the dim setting. In the example shown in FIGS. 6A-6E, when the refueling data 360 indicates that the receiver aircraft 112 is in the refueling range 132 and the refueling system 120 is supplying fuel to the receiver aircraft 112, the control system 370 activates a single refueling light source 242 at the bright setting based on the relative position of the receiver aircraft 112 within the refueling range 132. However, the indication system 134 can activate more than one refueling light source 242 at the bright setting in additional or alternative examples.

As one example, FIGS. 7A-7E depict the indication system 134 having five refueling light sources 242A-242E, which are each activated at the bright setting or the dim setting based on a position of the receiver aircraft 112 in different sub-ranges 732A-732E of the refueling range 132 while the refueling system 120 is supplying fuel to the receiver aircraft 112.

Figure 7A:
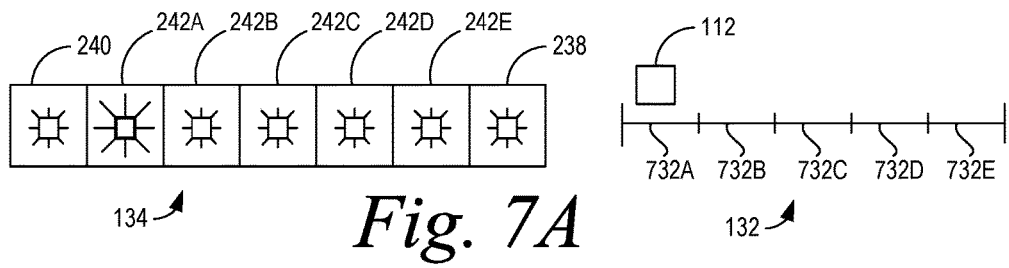
FIG. 7A illustrates a state of an indication system when a receiver aircraft in a position within a refueling range according to an example embodiment.
Figure 7B:
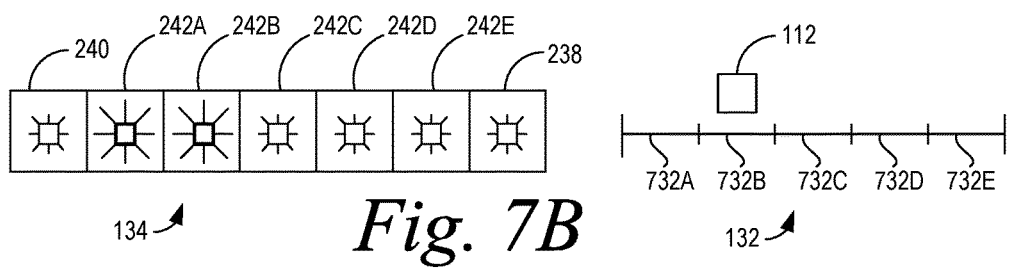
FIG. 7B illustrates another state of the indication system when the receiver aircraft in another position within the refueling range according to the example embodiment.
Figure 7C:
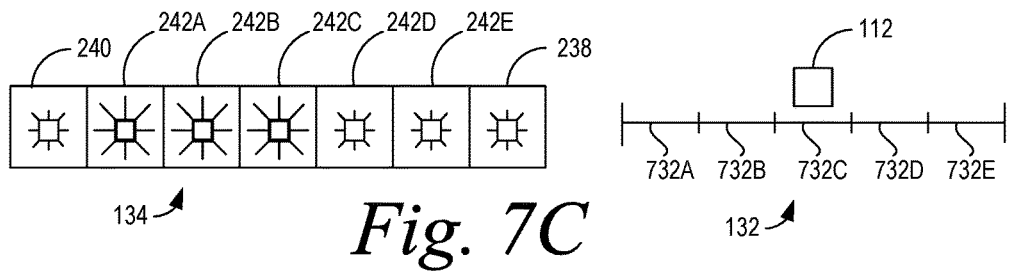
FIG. 7C illustrates another state of the indication system when the receiver aircraft in another position within the refueling range according to the example embodiment.
Figure 7D:
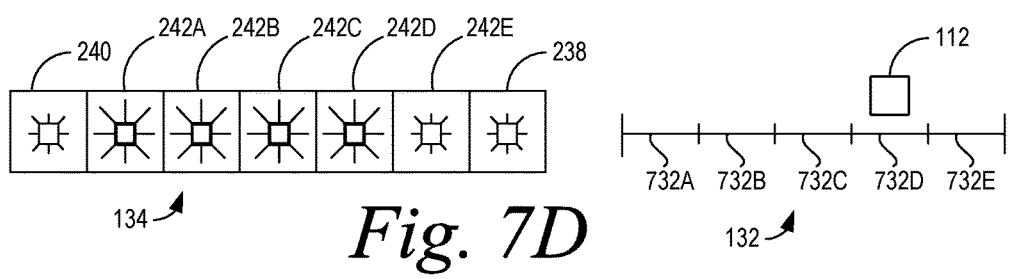
FIG. 7D illustrates another state of the indication system when the receiver aircraft in another position within the refueling range according to the example embodiment.
Figure 7E:
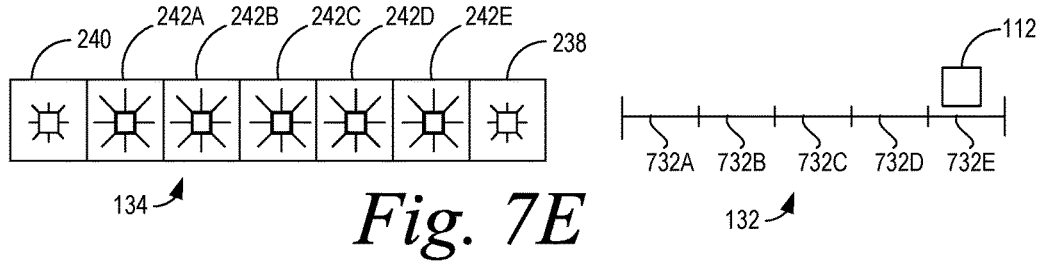
FIG. 7E illustrates another state of the indication system when the receiver aircraft in another position within the refueling range according to the example embodiment.

As shown in FIG. 7A, when the receiver aircraft 112 is in a first sub-range 732A, the control system 370 activates a first refueling light source 242A at the bright setting and activates a remainder of the refueling light sources 242B-242E at the dim setting. As shown in FIG. 7B, when the receiver aircraft 112 is in a second sub-range 732B, the control system 370 activates the first refueling light source 242A and a second refueling light source 242B at the bright setting, and activates the remainder of the refueling light sources 242C-242E at the dim setting. As shown in FIG. 7C, when the receiver aircraft 112 is in a third sub-range 732C, the control system 370 activates the first refueling light source 242A, the second refueling light source 242B and a third refueling light source 242C at the bright setting, and activates the remainder of the refueling light sources 242D-242E at the dim setting. As shown in FIG. 7D, when the receiver aircraft 112 is in a fourth sub-range 732D, the control system 370 activates the first refueling light source 242A, the second refueling light source 242B, the third refueling light source 242C, and a fourth refueling light source 242D at the bright setting, and activates the remainder of the refueling light sources 242E at the dim setting. As shown in FIG. 7E, when the receiver aircraft 112 is in a fifth sub-range 732E, the control system 370 activates the first refueling light source 242A, the second refueling light source 242B, the third refueling light source 242C, the fourth refueling light source 242D and the fifth refueling light source 242E at the bright setting.

Referring now to FIGS. 1-8, a flowchart for a process 800 of providing indications to a receiver aircraft 112 during a refueling operation using an indication system 134 of a refueling system 120 is illustrated according to an example embodiment. As described above, the indication system 134 includes a plurality of light sources 236 on a housing 124 of a tanker aircraft 110. The plurality of light sources 236 includes a not-ready light source 238, a waiting light source 240, and a plurality of refueling light sources 242. Each light source 236 is configured to simultaneously emit visible light and infrared light. Each light source 236 is operable at a bright setting and a dim setting.

Figure 8:
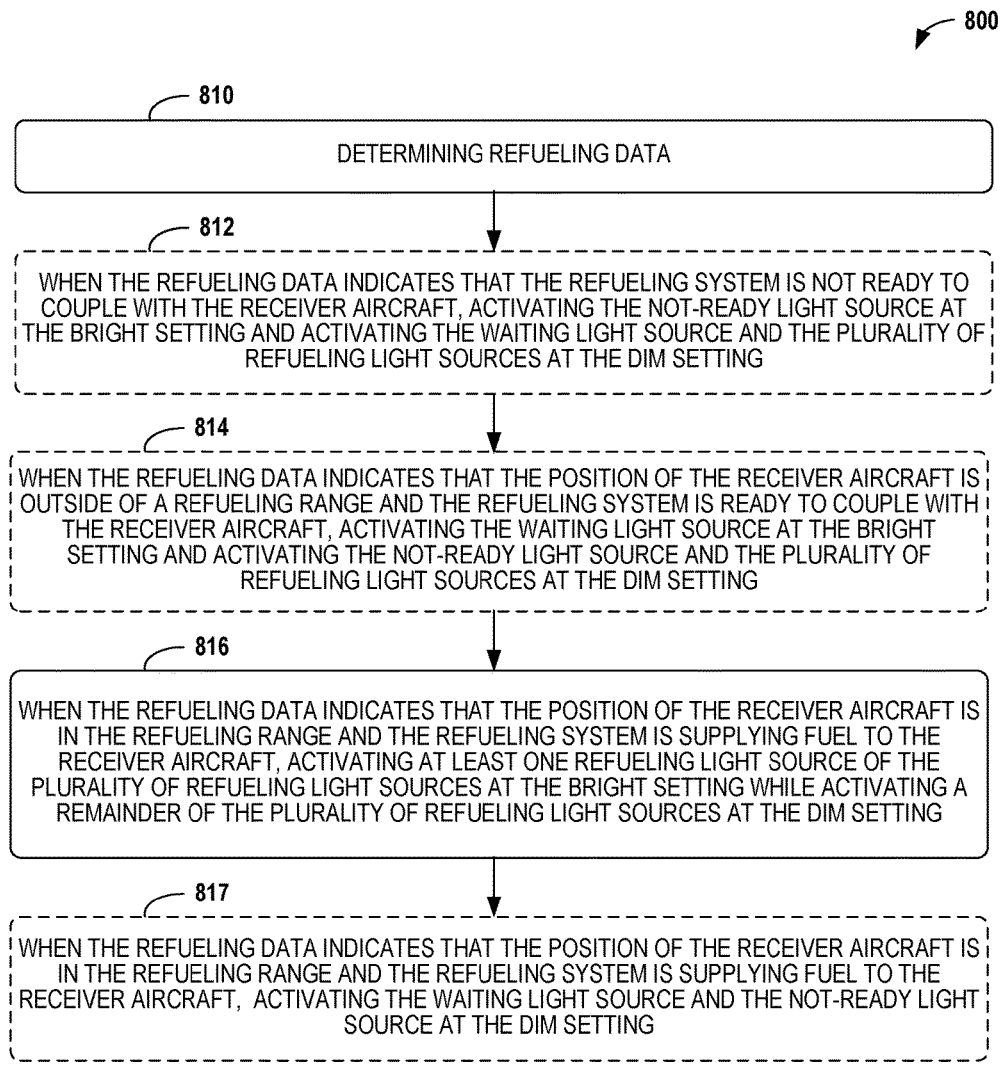
FIG. 8 illustrates a flow chart of an example process for providing indications to a receiver aircraft during a refueling operation according to an example embodiment.

As shown in FIG. 8, at block 810, the process 800 begins by determining refueling data 360. The refueling data 360 can include position data 364 indicating a position of the receiver aircraft 112 relative to the refueling system 120, ready-status data 366 indicating whether the refueling system 120 is ready to couple with the receiver aircraft 112 or not ready to couple with the receiver aircraft 112, and fueling-status data 368 indicating whether the refueling system 120 is supplying fuel or not supplying fuel.

At block 812, when the refueling data 360 indicates that the refueling system 120 is not ready to couple with the receiver aircraft 112, the process 800 can include activating the not-ready light source 238 at the bright setting and activating the waiting light source 240 and the plurality of refueling light sources 242 at the dim setting.

At block 814, when the refueling data 360 indicates that the position of the receiver aircraft 112 is outside of a refueling range 132 and the refueling system 120 is ready to couple with the receiver aircraft 112, the process 800 can include activating the waiting light source 240 at the bright setting and activating the not-ready light source 238 and the plurality of refueling light sources 242 at the dim setting.

At block 816, when the refueling data 360 indicates that the position of the receiver aircraft 112 is in the refueling range 132 and the refueling system 120 is supplying fuel to the receiver aircraft 112, the process 800 includes activating at least one refueling light source 242 of the plurality of refueling light sources 242 at the bright setting and activating a remainder of the plurality of refueling light sources 242 at the dim setting. At block 817, when the refueling data 360 indicates that the position of the receiver aircraft 112 is in the refueling range 132 and the refueling system 120 is supplying fuel to the receiver aircraft 112, the process 800 can also include activating the waiting light source 240 and the not-ready light source 238 at the dim setting.

Figure 9:
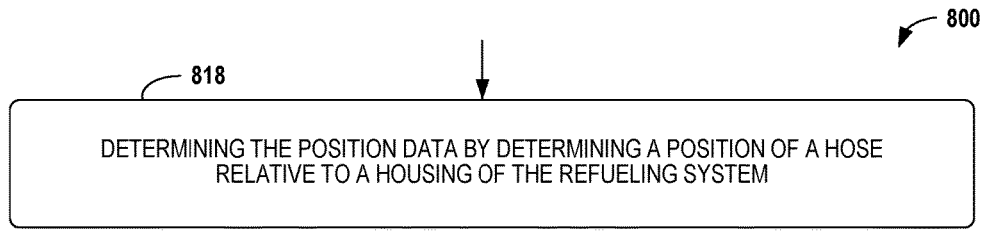
FIG. 9 illustrates a flow chart of an example process for providing indications to a receiver aircraft during a refueling operation that can be used with the process shown in FIG. 8.
Figure 10:
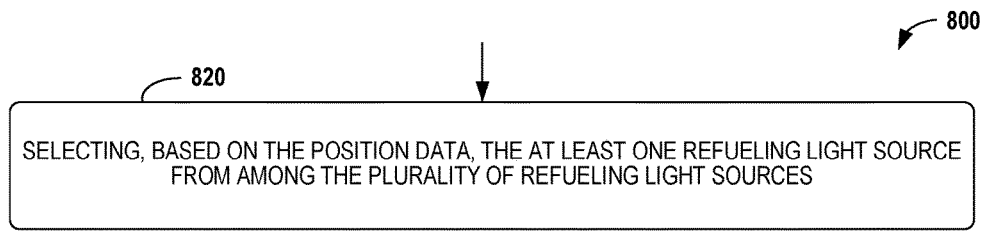
FIG. 10 illustrates a flow chart of an example process for providing indications to a receiver aircraft during a refueling operation that can be used with the process shown in FIG. 8 or FIG. 9.

FIGS. 9-13 depict additional or alternative operations that can be performed in connection with the process 800 shown in FIG. 8. As shown in FIG. 9, the process 800 can further include determining the position data 364 by determining a position of a hose 122 relative to a housing 124 of the refueling system 120 at block 818. As shown in FIG. 10, the process 800 can also include selecting, based on the position data 360, the at least one refueling light source 242 from among the plurality of refueling light sources 242 at block 820.

Figure 11:
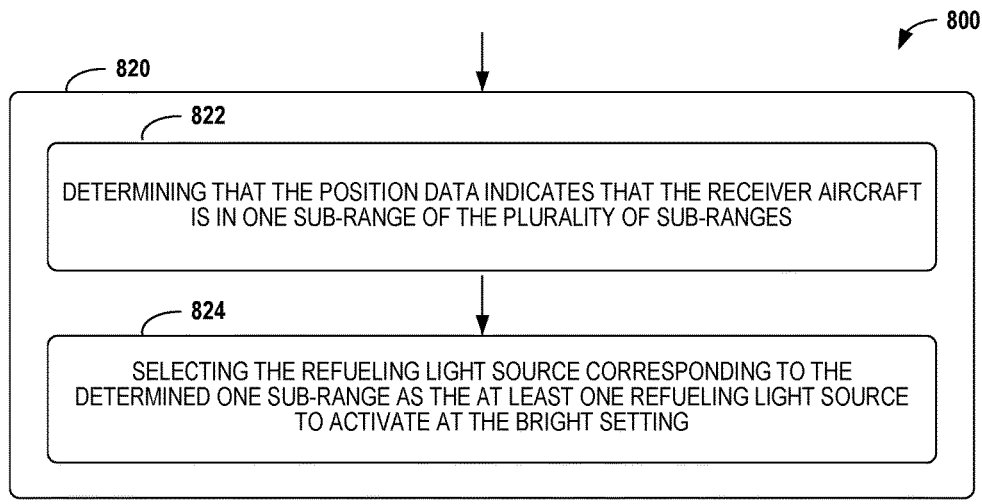
FIG. 11 illustrates a flow chart of an example process for providing indications to a receiver aircraft during a refueling operation that can be used with the process shown in FIG. 10.

In an example, the refueling range 132 includes a plurality of sub-ranges 632A-632C, and each refueling light source 242 corresponds to a respective one of the plurality of sub-ranges 632A-632A. In an implementation of this example, as shown in FIG. 11, selecting the at least one refueling light source 242 at block 820 can include: determining that the position data 364 indicates that the receiver aircraft 112 is in one sub-range 632A-632C of the plurality of sub-ranges 632A-632C at block 822, and selecting the refueling light source 242 corresponding to the determined one sub-range 632A-632C as the at least one refueling light source 242 to activate at the bright setting at block 824.

Figure 12:
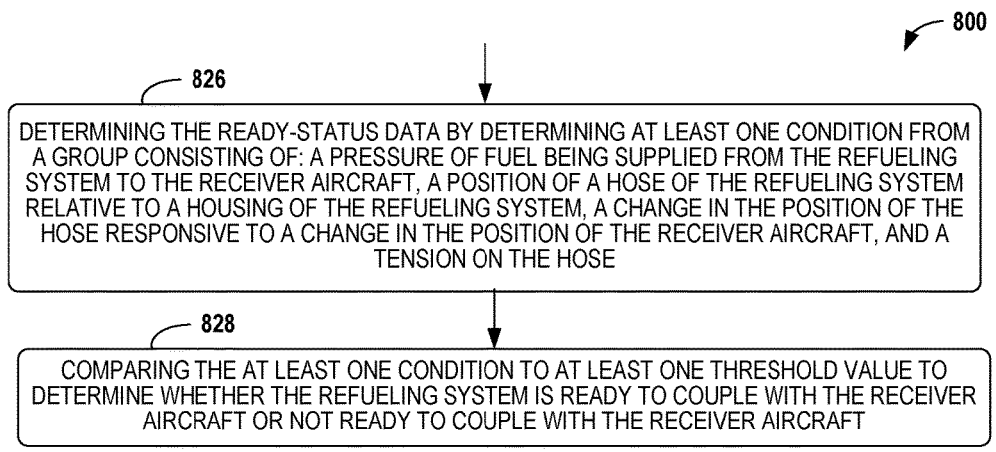
FIG. 12 illustrates a flow chart of an example process for providing indications to a receiver aircraft during a refueling operation that can be used with the process shown in FIGS. 8-11.

As shown in FIG. 12, the process 800 can include, at block 826, determining the ready-status data 366 by determining at least one condition from a group consisting of: a pressure of fuel being supplied from the refueling system 120 to the receiver aircraft 112, a position of a hose 122 of the refueling system 120 relative to a housing 124 of the refueling system 120, a change in the position of the hose 122 responsive to a change in the position of the receiver aircraft 112, and a tension on the hose 122. At block 828, the process 800 can also include comparing the at least one condition to at least one threshold value to determine whether the refueling system 120 is ready to couple with the receiver aircraft 112 or not ready to couple with the receiver aircraft 112.

Figure 13:
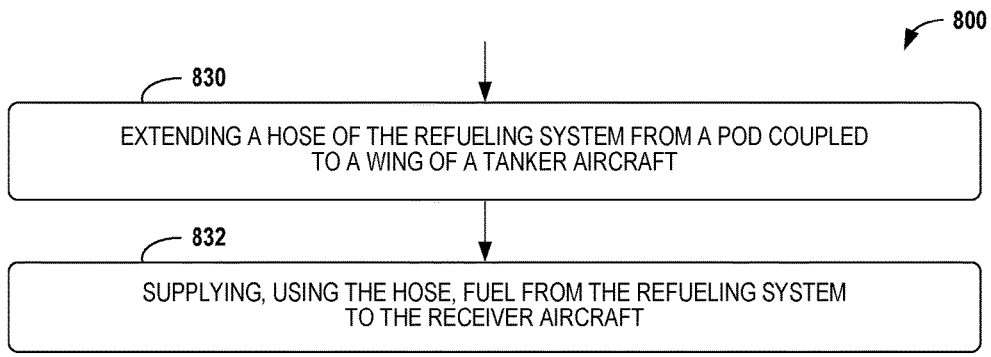
FIG. 13 illustrates a flow chart of an example process for providing indications to a receiver aircraft during a refueling operation that can be used with the process shown in FIGS. 8-12.

As shown in FIG. 13, the process 800 includes extending a hose 122 of the refueling system 120 from a pod 126 coupled to a wing 118 of a tanker aircraft 110 at block 830, and supplying, using the hose 122, fuel from the refueling system 120 to the receiver aircraft 112 at block 832.

Referring now to FIGS. 1-7E and 14, a flowchart for a process 1400 of providing indications to a receiver aircraft 112 during a refueling operation using an indication system 134 of a refueling system 120 is illustrated according to an example embodiment. The indication system 134 includes a plurality of light sources 236 on a housing 124 of a tanker aircraft 110. The plurality of light sources 236 includes a plurality of refueling light sources 242. Each light source 236 is configured to simultaneously emit visible light and infrared light. Each light source 236 is operable at a bright setting and a dim setting. Each refueling light source 236 corresponds to one or more positions within a refueling range 132 of the refueling system 120.

Figure 14:
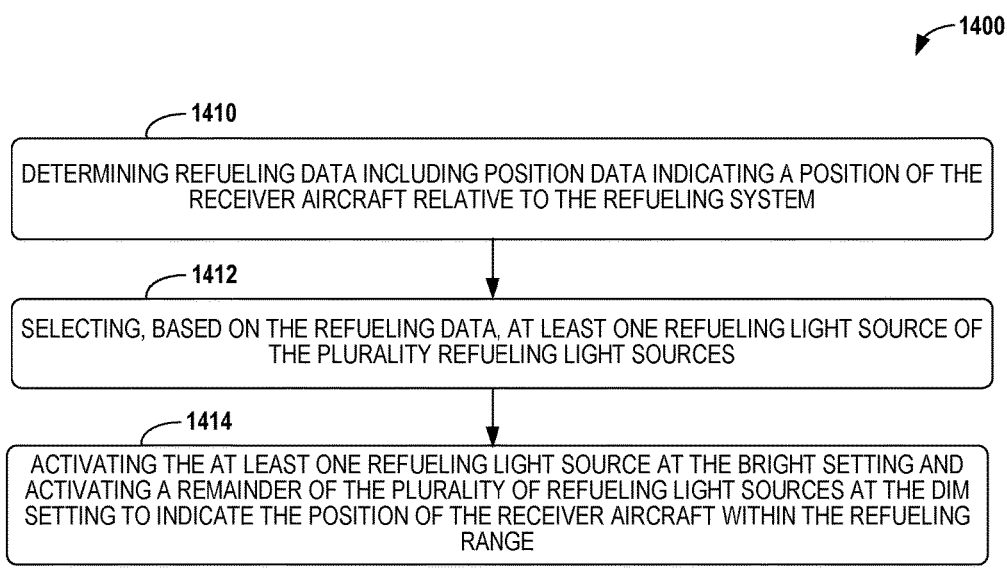
FIG. 14 illustrates a flow chart of an example process for providing indications to a receiver aircraft during a refueling operation according to an example embodiment.

As shown in FIG. 14, at block 1410, the process 1400 includes determining refueling data 360 including position data 364 indicating a position of the receiver aircraft 112 relative to the refueling system 120. At block 1412, the process 1400 includes selecting, based on the refueling data 360, at least one refueling light source 242 of the plurality refueling light sources 242. At block 1414, the process 1400 includes activating the at least one refueling light source 242 at the bright setting and activating a remainder of the plurality of refueling light sources 242 at the dim setting to indicate the position of the receiver aircraft 112 within the refueling range 132.

Any of the blocks shown in FIGS. 8-14 may represent a module, a segment, or a portion of program code, which includes one or more instructions executable by a processor for implementing specific logical functions or steps in the process. The program code may be stored on any type of computer readable medium or data storage, for example, such as a storage device including a disk or hard drive. Further, the program code can be encoded on a computer-readable storage media in a machine-readable format, or on other non-transitory media or articles of manufacture. The computer readable medium may include non-transitory computer readable medium or memory, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a tangible computer readable storage medium, for example.

In some instances, components of the devices and/or systems described herein may be configured to perform the functions such that the components are actually configured and structured (with hardware and/or software) to enable such performance. Example configurations then include one or more processors executing instructions to cause the system to perform the functions. Similarly, components of the devices and/or systems may be configured so as to be arranged or adapted to, capable of, or suited for performing the functions, such as when operated in a specific manner.

In FIGS. 8-14, referred to above, the blocks may represent operations and/or portions thereof and lines connecting the various blocks do not imply any particular order or dependency of the operations or portions thereof. Blocks represented by dashed lines indicate alternative operations and/or portions thereof. Dashed lines, if any, connecting the various blocks represent alternative dependencies of the operations or portions thereof. It will be understood that not all dependencies among the various disclosed operations are necessarily represented. FIGS. 8-14 and the accompanying disclosure describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, those skilled in the art will appreciate that not all operations described need be performed.

Further, the disclosure comprises embodiments according to the following clauses:

Clause 1. An indication system for use with a refueling system including a hose for supplying fuel to a receiver aircraft, the indication system comprising: a plurality of light sources including a not-ready light source, a waiting light source, and a plurality of refueling light sources, wherein each light source is configured to simultaneously emit visible light and infrared light, wherein each light source is operable at a dim setting and a bright setting; and a control system communicatively coupled with the plurality of light sources, wherein the control system is configured to receive refueling data from the refueling system, wherein the refueling data includes position data indicating a position of the receiver aircraft relative to the refueling system, ready-status data indicating whether the refueling system is ready to couple with the receiver aircraft or not ready to couple with the receiver aircraft, and fueling-status data indicating whether the refueling system is supplying fuel or not supplying fuel, wherein the control system is configured to: when the refueling data indicates that the refueling system is not ready to couple with the receiver aircraft, activate the not-ready light source at the bright setting and activate the waiting light source and the plurality of refueling light sources at the dim setting; when the refueling data indicates that the position of the receiver aircraft is outside of a refueling range and the refueling system is ready to couple with the receiver aircraft, activate the waiting light source at the bright setting and activate the not-ready light source and the plurality of refueling light sources at the dim setting; and when the refueling data indicates that the position of the receiver aircraft is in the refueling range and the refueling system is supplying fuel to the receiver aircraft, activate at least one refueling light source of the plurality of refueling light sources at the bright setting and activate a remainder of the plurality of refueling light sources, the waiting light source, and the not-ready light source at the dim setting.

Clause 2. The indication system of Clause 1, wherein the control system is further configured to select, based on the position data, the at least one refueling light source from among the plurality of refueling light sources.

Clause 3. The indication system of Clause 2, wherein the refueling range comprises a plurality of sub-ranges, and each refueling light source corresponds to a respective one of the plurality of sub-ranges, and wherein, to select the at least one refueling light source, the control system is configured to: determine that the position data indicates that the receiver aircraft is in one sub-range of the plurality of sub-ranges, and select the refueling light source corresponding to the determined one sub-range as the at least one refueling light source to activate at the bright setting.

Clause 4. The indication system of Clause 3, wherein the plurality of refueling light sources are positioned on a housing of the refueling system in an order that is the same as an order of the corresponding sub-ranges in the refueling range.

Clause 5. The indication system of any one of Clauses 1-4, wherein, for each light source, an intensity of the visible light emitted by the light at the bright setting is greater than an intensity of the visible light emitted by the light at the dim setting by at least a factor of two.

Clause 6. The indication system of any one of Clauses 1-5, wherein the at least one waiting light source is operable to emit the visible light in a first wavelength range, the at least one not-ready light source is operable to emit the visible light in a second wavelength range, and each of the plurality of refueling light sources is operable to emit the visible light in a third wavelength range, and wherein the first wavelength range, the second wavelength range, and the third wavelength range are different than each other.

Clause 7. The indication system of Clause 6, wherein the first wavelength range provides an amber light, the second wavelength range provides a red light, and the third wavelength range provides a green light.

Clause 8. The indication system of any one of Clauses 1-7, wherein at least one of: the waiting light source comprises a plurality of waiting light sources or the not-ready light source comprises a plurality of not-ready light sources.

Clause 9. A refueling system comprising: a pod; a hose extending from the pod and movable relative to the pod, wherein the hose is configured to supply fuel to a receiver aircraft; a hose sensing system configured to (a) sense a condition of the hose and (b) generate, based on the sensed condition, refueling data, wherein the refueling data includes position data indicating a position of the receiver aircraft relative to the refueling system, ready-status data indicating whether the refueling system is ready to couple with the receiver aircraft or not ready to couple with the receiver aircraft, and fueling-status data indicating whether the refueling system is supplying fuel or not supplying fuel; an indication system comprising a plurality of light sources including a not-ready light source, a waiting light source, and a plurality of refueling light sources, wherein each light source is configured to simultaneously emit visible light and infrared light, wherein each light source is operable at a dim setting and a bright setting; and a control system communicatively coupled with the plurality of light sources and the hose sensing system, wherein the control system is configured to: (i) when the refueling data indicates that the refueling system is not ready to couple with the receiver aircraft, activate the not-ready light source at the bright setting and activate the waiting light source and the plurality of refueling light sources at the dim setting, (ii) when the refueling data indicates that the position of the receiver aircraft is outside of a refueling range and the refueling system is ready to couple with the receiver aircraft, activate the waiting light source at the bright setting and activate the not-ready light source and the plurality of refueling light sources at the dim setting, and (iii) when the refueling data indicates that the position of the receiver aircraft is in the refueling range and the refueling system is supplying fuel to the receiver aircraft, activate at least one refueling light source of the plurality of refueling light sources at the bright setting and activate a remainder of the plurality of refueling light sources, the waiting light source, and the not-ready light source at the dim setting.

Clause 10. The refueling system of Clause 9, wherein the pod is configured to couple to an aircraft wing.

Clause 11. The refueling system of Clause 9 or 10, wherein the condition comprises at least one of the group consisting of: a pressure of the fuel supplied by the hose to the receiver aircraft, a position of the hose relative to the pod, a change in the position of the hose responsive to a change in the position of the receiver aircraft, and a tension on the hose when the hose is coupled to the receiver aircraft.

Clause 12. The refueling system of any one of Clauses 9-11, wherein the hose sensing system is configured to determine the position data based on the position of the hose relative to the pod.

Clause 13. The refueling system of any one of Clauses 9-12, wherein the plurality of light sources are arranged in a linear pattern on the pod.

Clause 14. The refueling system of any one of Clauses 9-12, wherein the plurality of light sources are arranged in an arcing contour that corresponds to an arcing contour of the pod.

Clause 15. A method for providing indications to a receiver aircraft during a refueling operation using an indication system of a refueling system, wherein the indication system includes a plurality of light sources on a housing of a tanker aircraft, wherein the plurality of light sources include a not-ready light source, a waiting light source, and a plurality of refueling light sources, wherein each light source is configured to simultaneously emit visible light and infrared light, wherein each light source is operable at a bright setting and a dim setting, the method comprising: determining refueling data including position data indicating a position of the receiver aircraft relative to the refueling system, ready-status data indicating whether the refueling system is ready to couple with the receiver aircraft or not ready to couple with the receiver aircraft, and fueling-status data indicating whether the refueling system is supplying fuel or not supplying fuel; when the refueling data indicates that the refueling system is not ready to couple with the receiver aircraft, activating the not-ready light source at the bright setting and activating the waiting light source and the plurality of refueling light sources at the dim setting; when the refueling data indicates that the position of the receiver aircraft is outside of a refueling range and the refueling system is ready to couple with the receiver aircraft, activating the waiting light source at the bright setting and activating the not-ready light source and the plurality of refueling light sources at the dim setting; and when the refueling data indicates that the position of the receiver aircraft is in the refueling range and the refueling system is supplying fuel to the receiver aircraft, activating at least one refueling light source of the plurality of refueling light sources at the bright setting and activating a remainder of the plurality of refueling light sources, the waiting light source, and the not-ready light source at the dim setting.

Clause 16. The method of Clause 15, further comprising determining the position data by determining a position of a hose relative to a housing of the refueling system.

Clause 17. The method of Clause 15 or 16, further comprising selecting, based on the position data, the at least one refueling light source from among the plurality of refueling light sources.

Clause 18. The method of Clause 17, wherein the refueling range comprises a plurality of sub-ranges, each refueling light source corresponds to a respective one of the plurality of sub-ranges, and selecting the at least one refueling light source comprises: determining that the position data indicates that the receiver aircraft is in one sub-range of the plurality of sub-ranges; and selecting the refueling light source corresponding to the determined one sub-range as the at least one refueling light source to activate at the bright setting.

Clause 19. The method of any one of Clauses 15-18, further comprising: determining the ready-status data by determining at least one condition from a group consisting of: a pressure of fuel being supplied from the refueling system to the receiver aircraft, a position of a hose of the refueling system relative to a housing of the refueling system, a change in the position of the hose responsive to a change in the position of the receiver aircraft, and a tension on the hose; and comparing the at least one condition to at least one threshold value to determine whether the refueling system is ready to couple with the receiver aircraft or not ready to couple with the receiver aircraft.

Clause 20. The method of any one of Clauses 15-19, further comprising: extending a hose of the refueling system from a pod coupled to a wing of a tanker aircraft; and supplying, using the hose, fuel from the refueling system to the receiver aircraft.

Clause 21. An indication system for use with a refueling system including a hose for supplying fuel to a receiver aircraft, the indication system comprising: a plurality of refueling light sources, wherein each refueling light source is configured to simultaneously emit visible light and infrared light, wherein each refueling light source is operable at a dim setting and a bright setting; and a control system communicatively coupled with the plurality of refueling light sources, wherein the control system is configured to receive refueling data from the refueling system, wherein the refueling data includes position data indicating a position of the receiver aircraft relative to the refueling system and fueling-status data indicating whether the refueling system is supplying fuel or not supplying fuel, wherein the control system is configured to, when the refueling data indicates that the position of the receiver aircraft is in the refueling range and the refueling system is supplying fuel to the receiver aircraft, activate at least one refueling light source of the plurality of refueling light sources at the bright setting and activate a remainder of the plurality of refueling light sources at the dim setting.

Clause 22. The indication system of Clause 21, wherein the control system is further configured to select, based on the position data, the at least one refueling light source from among the plurality of refueling light sources.

Clause 23. The indication system of Clause 22, wherein the refueling range comprises a plurality of sub-ranges, and each refueling light source corresponds to a respective one of the plurality of sub-ranges, and wherein, to select the at least one refueling light source, the control system is configured to: (i) determine that the position data indicates that the receiver aircraft is in one sub-range of the plurality of sub-ranges, and (ii) select the refueling light source corresponding to the determined one sub-range as the at least one refueling light source to activate at the bright setting.

Clause 24. The indication system of Clause 23, wherein the plurality of refueling light sources are positioned on a housing of the refueling system in an order that is the same as an order of the corresponding sub-ranges in the refueling range.

Clause 25. The indication system of any one of Clauses 21-24, wherein, for each refueling light source, an intensity of the visible light emitted by the light at the bright setting is greater than an intensity of the visible light emitted by the light at the dim setting by at least a factor of two.

Clause 26. The indication system of any one of Clause 21-25, further comprising a not-ready light source and a waiting light source, wherein the not-ready light source and the waiting light source are each configured to simultaneously emit visible light and infrared light, wherein the not-ready light source and the waiting light source are each operable at the bright setting and the dim setting, wherein the refueling data further includes ready-status data indicating whether the refueling system is ready to couple with the receiver aircraft or not ready to couple with the receiver aircraft, and wherein the control system is configured to: (i) when the refueling data indicates that the refueling system is not ready to couple with the receiver aircraft, activate the not-ready light source at the bright setting and activate the waiting light source and the plurality of refueling light sources at the dim setting, and (ii) when the refueling data indicates that the position of the receiver aircraft is outside of a refueling range and the refueling system is ready to couple with the receiver aircraft, activate the waiting light source at the bright setting and activate the not-ready light source and the plurality of refueling light sources at the dim setting.

Clause 27. The indication system of Clause 26, wherein the at least one waiting light source is operable to emit the visible light in a first wavelength range, the at least one not-ready light source is operable to emit the visible light in a second wavelength range, and each of the plurality of refueling light sources is operable to emit the visible light in a third wavelength range, and wherein the first wavelength range, the second wavelength range, and the third wavelength range are different than each other.

Clause 28. The indication system of Clause 27, wherein the first wavelength range provides an amber light, the second wavelength range provides a red light, and the third wavelength range provides a green light.

Clause 29. The indication system of any one of Clauses 26-28, wherein at least one of: the waiting light source comprises a plurality of waiting light sources or the not-ready light source comprises a plurality of not-ready light sources.

Clause 30. A refueling system comprising: the indication system according to any one of Clauses 21-29; a housing; the hose extending from the housing and movable relative to the housing, wherein the hose is configured to supply fuel to a receiver aircraft; and a hose sensing system configured to (i) sense a condition of the hose and (ii) generate, based on the sensed condition, the refueling data.

Clause 31. The refueling system of Clause 30, wherein the housing comprises a pod that is configured to couple to an aircraft wing.

Clause 32. The refueling system of Clause 30 or 31, wherein the condition comprises at least one of the group consisting of: a pressure of the fuel supplied by the hose to the receiver aircraft, a position of the hose relative to the housing, a change in the position of the hose responsive to a change in the position of the receiver aircraft, and a tension on the hose when the hose is coupled to the receiver aircraft.

Clause 33. The refueling system of any one of Clauses 30-32, wherein the hose sensing system is configured to determine the position data based on the position of the hose relative to the housing.

Clause 34. The refueling system of any one of Clauses 30-33, wherein the plurality of refueling light sources are arranged in a linear pattern on the housing.

Clause 35. The refueling system of any one of Clauses 30-33, wherein the plurality of light sources are arranged in an arcing contour that corresponds to an arcing contour of the housing.

Clause 36. A method for providing indications to a receiver aircraft during a refueling operation using an indication system of a refueling system, wherein the indication system includes a plurality of refueling light sources on a housing of a tanker aircraft, wherein each refueling light source is configured to simultaneously emit visible light and infrared light, wherein each refueling light source is operable at a bright setting and a dim setting, wherein each refueling light source corresponds to one or more positions within a refueling range of the refueling system, the method comprising: determining refueling data including position data indicating a position of the receiver aircraft relative to the refueling system; selecting, based on the refueling data, at least one refueling light source of the plurality refueling light sources; and activating the at least one refueling light source at the bright setting while activating a remainder of the plurality of refueling light sources at the dim setting to indicate the position of the receiver aircraft within the refueling range.

Clause 37. The method of Clause 36, wherein determining the refueling data further comprises determining ready-status data indicating whether the refueling system is ready to couple with the receiver aircraft or not ready to couple with the receiver aircraft, and wherein the method further comprises: when the refueling data indicates that the refueling system is not ready to couple with the receiver aircraft, activating the not-ready light source at the bright setting and activating the waiting light source and the plurality of refueling light sources at the dim setting; and when the refueling data indicates that the position of the receiver aircraft is outside of the refueling range and the refueling system is ready to couple with the receiver aircraft, activating the waiting light source at the bright setting and activating the not-ready light source and the plurality of refueling light sources at the dim setting.

Clause 38. The method of Clause 37, further comprising: determining the ready-status data by determining at least one condition from a group consisting of: a pressure of fuel being supplied from the refueling system to the receiver aircraft, a position of a hose of the refueling system relative to a housing of the refueling system, a change in the position of the hose responsive to a change in the position of the receiver aircraft, and a tension on the hose; and comparing the at least one condition to at least one threshold value to determine whether the refueling system is ready to couple with the receiver aircraft or not ready to couple with the receiver aircraft.

Clause 39. The method of any one of Clauses 36-38, wherein determining the refueling data further comprises determining fueling-status data indicating whether the refueling system is supplying fuel or not supplying fuel, and wherein activating the at least one refueling light source of the plurality of refueling light sources at the bright setting and activating the remainder of the plurality of refueling light sources at the dim setting is responsive to the refueling data indicating that the position of the receiver aircraft is in the refueling range and the refueling system is supplying fuel to the receiver aircraft.

Clause 40. The method of any one of Clauses 36-39, further comprising determining the position data by determining a position of a hose relative to a housing of the refueling system.

Clause 41. The method of any one of Clauses 36-40, wherein the refueling range comprises a plurality of sub-ranges, each refueling light source corresponds to a respective one of the plurality of sub-ranges, and selecting the at least one refueling light source comprises: determining that the position data indicates that the receiver aircraft is in one sub-range of the plurality of sub-ranges; and selecting the refueling light source corresponding to the determined one sub-range as the at least one refueling light source to activate at the bright setting.

Clause 42. The method of any one of Clauses 36-41, further comprising: extending a hose of the refueling system from a pod coupled to a wing of a tanker aircraft; and supplying, using the hose, fuel from the refueling system to the receiver aircraft.

Clause 43. A pod comprising: the indication system according to any one of Clauses 21-29; the hose; and a hose sensing system configured to (i) sense a condition of the hose and (ii) generate, based on the sensed condition, the refueling data.

The description of the different advantageous arrangements has been presented for purposes of illustration and description, and is not intended to be exhaustive or limited to the embodiments in the form disclosed. Many modifications and variations will be apparent to those of ordinary skill in the art. Further, different advantageous embodiments may describe different advantages as compared to other advantageous embodiments. The embodiment or embodiments selected are chosen and described in order to explain the principles of the embodiments, the practical application, and to enable others of ordinary skill in the art to understand the disclosure for various embodiments with various modifications as are suited to the particular use contemplated.

What is claimed is:

1. An indication system for use with a refueling system including a hose sensing system for a hose for supplying fuel to a receiver aircraft, the indication system comprising:
   a plurality of light sources including a not-ready light source, a waiting light source, and a plurality of refueling light sources, wherein each light source is configured to simultaneously emit visible light and infrared light, wherein each light source is operable at a dim setting and a bright setting; and
   a control system communicatively coupled with the plurality of light sources, wherein the control system is configured to receive refueling data from the hose sensing system of the refueling system, wherein a sensor of the hose sensing system is configured to sense a condition of the hose to provide the refueling data that includes position data indicating a position of the receiver aircraft relative to the refueling system, ready-status data indicating whether the refueling system is ready to couple with the receiver aircraft or not ready to couple with the receiver aircraft, and fueling-status data indicating whether the refueling system is supplying fuel or not supplying fuel,
   wherein the control system is configured,
      in response to refueling data that indicates that the refueling system is not ready to couple with the receiver aircraft, to activate the not-ready light source at the bright setting and activate the waiting light source and the plurality of refueling light sources at the dim setting;
      in response to refueling data that indicates that the position of the receiver aircraft is outside of a refueling range and the refueling system is ready to couple with the receiver aircraft, to activate the waiting light source at the bright setting and activate the not-ready light source and the plurality of refueling light sources at the dim setting; and
      in response to refueling data that indicates that the position of the receiver aircraft is in the refueling range and the refueling system is supplying fuel to the receiver aircraft, to activate at least one refueling light source of the plurality of refueling light sources at the bright setting and activate a remainder of the plurality of refueling light sources, the waiting light source, and the not-ready light source at the dim setting.

2. The indication system of claim 1, wherein the control system is further configured to select, based on the position data, the at least one refueling light source from among the plurality of refueling light sources.

3. The indication system of claim 2, wherein the refueling range comprises a plurality of sub-ranges, and each refueling light source corresponds to a respective one of the plurality of sub-ranges, and wherein, to select the at least one refueling light source, the control system is configured to:
determine that the position data indicates that the receiver aircraft is in one sub-range of the plurality of sub-ranges, and
select the refueling light source corresponding to the determined one sub-range as the at least one refueling light source to activate at the bright setting.

4. The indication system of claim 3, wherein the plurality of refueling light sources are positioned on a housing of the refueling system in an order that is the same as an order of the corresponding sub-ranges in the refueling range.

5. The indication system of claim 1, wherein, for each light source, an intensity of the visible light emitted by the light at the bright setting is greater than an intensity of the visible light emitted by the light at the dim setting by at least a factor of two.

6. The indication system of claim 1, wherein the at least one waiting light source is operable to emit the visible light in a first wavelength range, the at least one not-ready light source is operable to emit the visible light in a second wavelength range, and each of the plurality of refueling light sources is operable to emit the visible light in a third wavelength range, and
wherein the first wavelength range, the second wavelength range, and the third wavelength range are different than each other.

7. The indication system of claim 6, wherein the first wavelength range provides an amber light, the second wavelength range provides a red light, and the third wavelength range provides a green light.

8. The indication system of claim 1, wherein at least one of: the waiting light source comprises a plurality of waiting light sources or the not-ready light source comprises a plurality of not-ready light sources.

9. A refueling system comprising:
a pod;
a hose extending from the pod and movable relative to the pod, wherein the hose is configured to supply fuel to a receiver aircraft;
a hose sensing system comprising: (i) a sensor configured to sense a condition of the hose and (ii) a processor configured to generate, based on the sensed condition, refueling data, wherein the refueling data includes position data indicating a position of the receiver aircraft relative to the refueling system, ready-status data indicating whether the refueling system is ready to couple with the receiver aircraft or not ready to couple with the receiver aircraft, and fueling-status data indicating whether the refueling system is supplying fuel or not supplying fuel;
an indication system comprising a plurality of light sources including a not-ready light source, a waiting light source, and a plurality of refueling light sources, wherein each light source is configured to simultaneously emit visible light and infrared light, wherein each light source is operable at a dim setting and a bright setting; and
a control system communicatively coupled with the plurality of light sources and the hose sensing system, wherein the control system is configured to:
when the refueling data indicates that the refueling system is not ready to couple with the receiver aircraft, activate the not-ready light source at the bright setting and activate the waiting light source and the plurality of refueling light sources at the dim setting,
when the refueling data indicates that the position of the receiver aircraft is outside of a refueling range and the refueling system is ready to couple with the receiver aircraft, activate the waiting light source at the bright setting and activate the not-ready light source and the plurality of refueling light sources at the dim setting, and
when the refueling data indicates that the position of the receiver aircraft is in the refueling range and the refueling system is supplying fuel to the receiver aircraft, activate at least one refueling light source of the plurality of refueling light sources at the bright setting and activate a remainder of the plurality of refueling light sources, the waiting light source, and the not-ready light source at the dim setting.

10. The refueling system of claim 9, wherein the pod is configured to couple to an aircraft wing.

11. The refueling system of claim 9, wherein the condition comprises at least one of the group consisting of: a pressure of the fuel supplied by the hose to the receiver aircraft, a position of the hose relative to the pod, a change in the position of the hose responsive to a change in the position of the receiver aircraft, and a tension on the hose when the hose is coupled to the receiver aircraft.

12. The refueling system of claim 11, wherein the hose sensing system is configured to determine the position data based on the position of the hose relative to the pod.

13. The refueling system of claim 9, wherein the plurality of light sources are arranged in a linear pattern on the pod.

14. The refueling system of claim 9, wherein the plurality of light sources are arranged in an arcing contour that corresponds to an arcing contour of the pod.

15. A method for providing refueling system status indications to a receiver aircraft during a refueling operation using an indication system and a hose sensing system for a fuel supply hose of a refueling system, wherein the indication system includes a plurality of light sources on a housing of a tanker aircraft, wherein the plurality of light sources include a not-ready light source, a waiting light source, and a plurality of refueling light sources, wherein each light source is configured to simultaneously emit visible light and infrared light, wherein each light source is operable at a bright setting and a dim setting, the method comprising:
determining, utilizing a sensor of the hose sensing system that is configured to sense a condition of the hose, refueling data including position data indicating a position of the receiver aircraft relative to the refueling system, ready-status data indicating whether the refueling system is ready to couple with the receiver aircraft or not ready to couple with the receiver aircraft, and fueling-status data indicating whether the refueling system is supplying fuel or not supplying fuel;
when the refueling data indicates that the refueling system is not ready to couple with the receiver aircraft, activating the not-ready light source at the bright setting and activating the waiting light source and the plurality of refueling light sources at the dim setting;
when the refueling data indicates that the position of the receiver aircraft is outside of a refueling range and the refueling system is ready to couple with the receiver aircraft, activating the waiting light source at the bright setting and activating the not-ready light source and the plurality of refueling light sources at the dim setting; and
when the refueling data indicates that the position of the receiver aircraft is in the refueling range and the refueling system is supplying fuel to the receiver aircraft, activating at least one refueling light source of the plurality of refueling light sources at the bright setting and activating a remainder of the plurality of refueling light sources, the waiting light source, and the not-ready light source at the dim setting.

16. The method of claim 15, further comprising determining the position data by determining a position of the hose relative to a housing of the refueling system.

17. The method of claim 15, further comprising selecting, based on the position data, the at least one refueling light source from among the plurality of refueling light sources.

18. The method of claim 17, wherein the refueling range comprises a plurality of sub-ranges, each refueling light source corresponds to a respective one of the plurality of sub-ranges, and selecting the at least one refueling light source comprises:

determining that the position data indicates that the receiver aircraft is in one sub-range of the plurality of sub-ranges; and selecting the refueling light source corresponding to the determined one sub-range as the at least one refueling light source to activate at the bright setting.

19. The method of claim 15, further comprising:

determining the ready-status data by determining at least one condition from a group consisting of: a pressure of fuel being supplied from the refueling system to the receiver aircraft, a position of the hose of the refueling system relative to a housing of the refueling system, a change in the position of the hose responsive to a change in the position of the receiver aircraft, and a tension on the hose; and comparing the at least one condition to at least one threshold value to determine whether the refueling system is ready to couple with the receiver aircraft or not ready to couple with the receiver aircraft.

20. The method of claim 15, further comprising:

extending the hose of the refueling system from a pod coupled to a wing of a tanker aircraft; and supplying, using the hose, fuel from the refueling system to the receiver aircraft.

\* \* \* \* \*